(12) United States Patent
Yang et al.

(10) Patent No.: US 11,889,450 B2
(45) Date of Patent: Jan. 30, 2024

(54) TECHNIQUES FOR COMPENSATING TIMING ADVANCE FOR FULL DUPLEX COMMUNICATION

(71) Applicant: QUALCOMM Incorporated, San Diego, CA (US)

(72) Inventors: Wei Yang, San Diego, CA (US); Seyed Ali Akbar Fakoorian, San Diego, CA (US); Muhammad Sayed Khairy Abdelghaffar, San Jose, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 17/308,904

(22) Filed: May 5, 2021

(65) Prior Publication Data

US 2021/0352604 A1 Nov. 11, 2021

Related U.S. Application Data

(60) Provisional application No. 63/021,018, filed on May 6, 2020.

(51) Int. Cl.
*H04W 56/00* (2009.01)
*H04B 17/336* (2015.01)
*H04W 24/10* (2009.01)

(52) U.S. Cl.
CPC ........ *H04W 56/005* (2013.01); *H04B 17/336* (2015.01); *H04W 24/10* (2013.01); *H04W 56/001* (2013.01)

(58) Field of Classification Search
None
See application file for complete search history.

(56) References Cited

U.S. PATENT DOCUMENTS

| 2018/0199353 | A1* | 7/2018 | Ahn | H04W 74/08 |
| 2019/0191399 | A1 | 6/2019 | Islam et al. | |
| 2020/0413453 | A1* | 12/2020 | Shao | H04W 74/00 |
| 2021/0168714 | A1* | 6/2021 | Guan | H04B 7/0404 |
| 2022/0053555 | A1* | 2/2022 | Chen | H04B 7/1853 |

(Continued)

FOREIGN PATENT DOCUMENTS

| WO | 2019062779 A1 | 4/2019 |
| WO | 2019192409 A1 | 10/2019 |

OTHER PUBLICATIONS

International Search Report and Written Opinion—PCT/US2021/031180—ISA/EPO—dated Nov. 11, 2021.

(Continued)

*Primary Examiner* — Scott M Sciacca
(74) *Attorney, Agent, or Firm* — Procopio, Cory, Hargreaves & Savitch LLP/QUALCOMM

(57) ABSTRACT

Techniques for compensating timing advance for full duplex communications are disclosed. In an example, a user equipment (UE) may receive, from a base station, a timing advance value and a compensation factor. The UE may also determine a timing compensation amount indicating an amount of time to adjust an uplink (UL) transmission based on the timing advance value and the compensation factor. The UE may also transmit, to the base station, the UL transmission according to the timing compensation amount. Other features are also described.

30 Claims, 18 Drawing Sheets

(56) References Cited

U.S. PATENT DOCUMENTS

| | | | |
|---|---|---|---|
| 2022/0182160 A1* | 6/2022 | Su | H04L 27/2691 |
| 2022/0312503 A1* | 9/2022 | Gong | H04L 27/2663 |
| 2023/0049008 A1* | 2/2023 | Nishio | H04W 56/0045 |

OTHER PUBLICATIONS

Partial International Search Report—PCT/US2021/031180—ISA/EPO—dated Sep. 17, 2021.

* cited by examiner

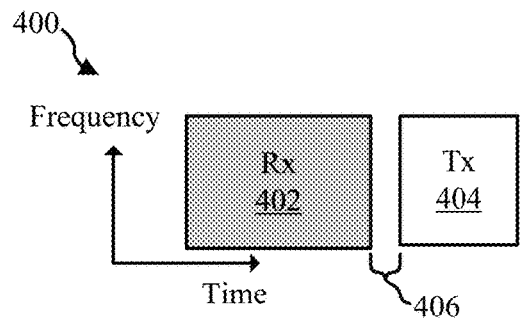
TDD: Half Duplex
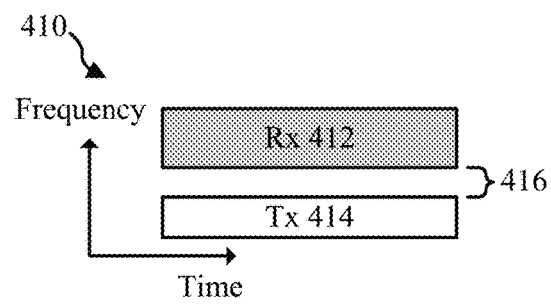
FDD: Half Duplex
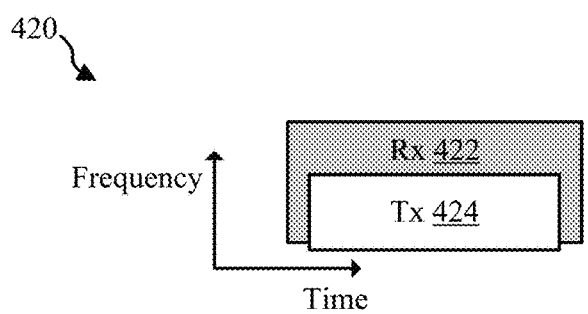
Full Duplex
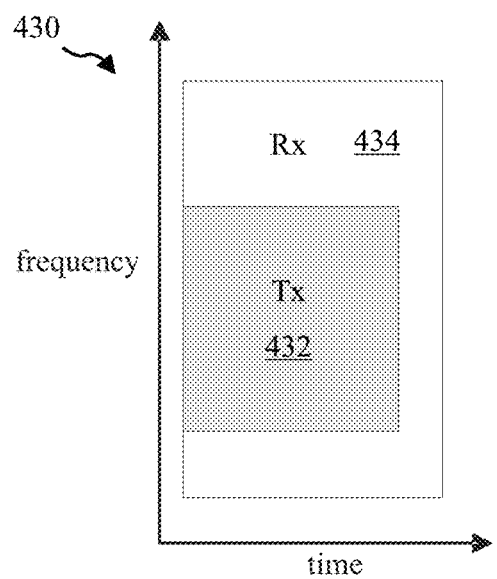
Full Duplex
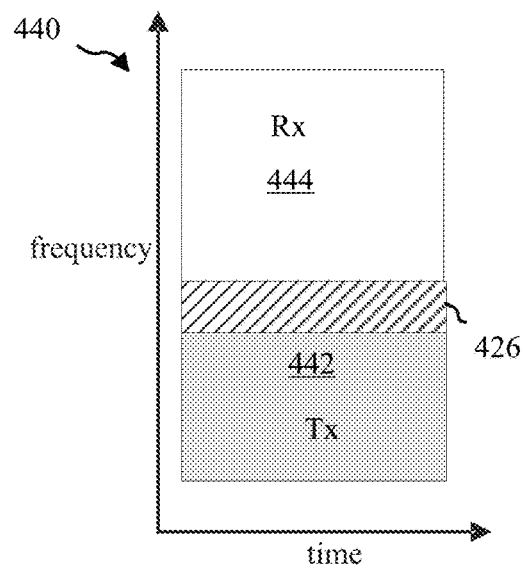
Full Duplex
FIG. 4

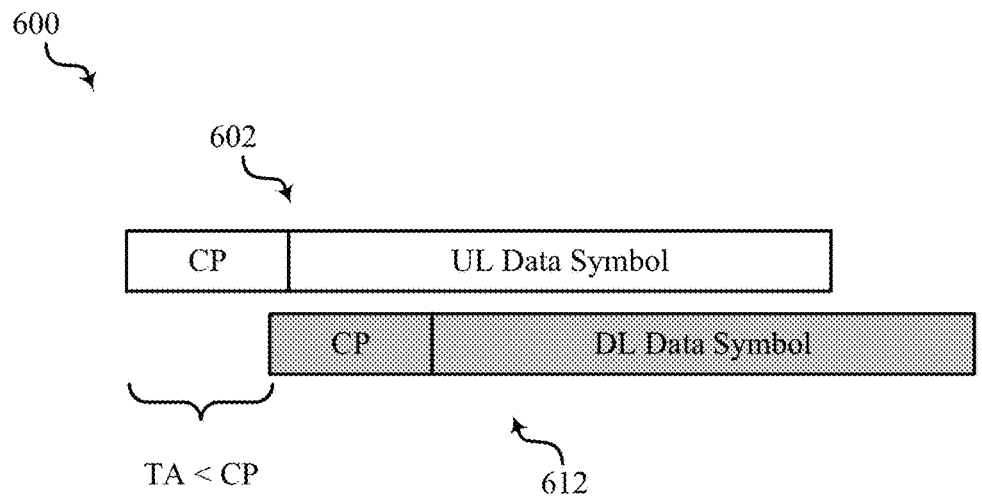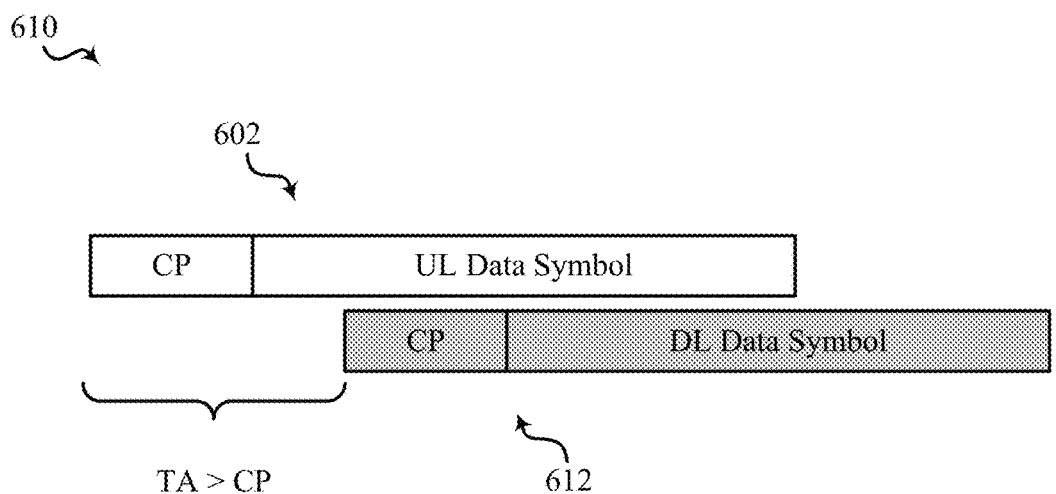
FIG. 6

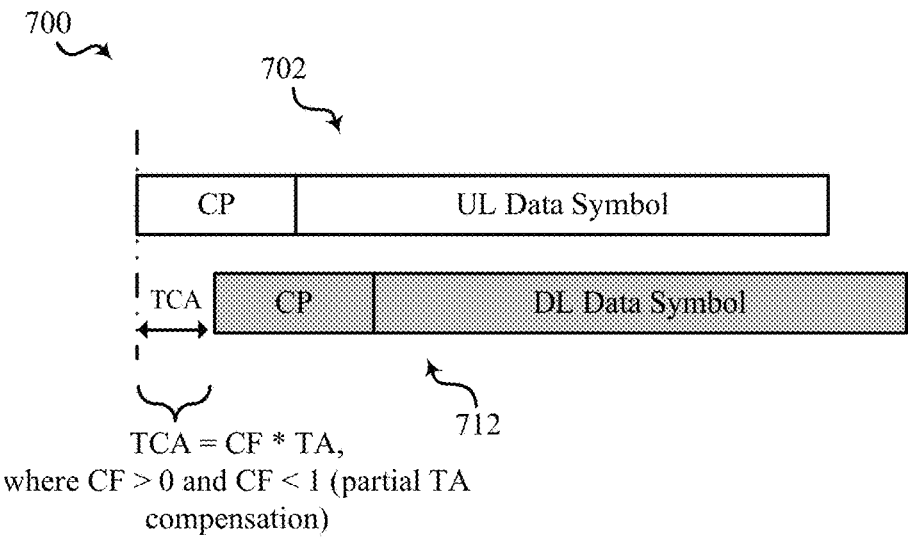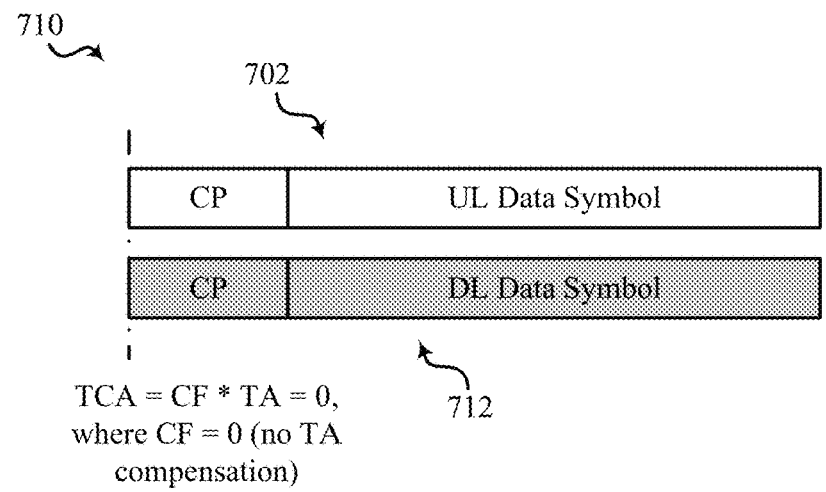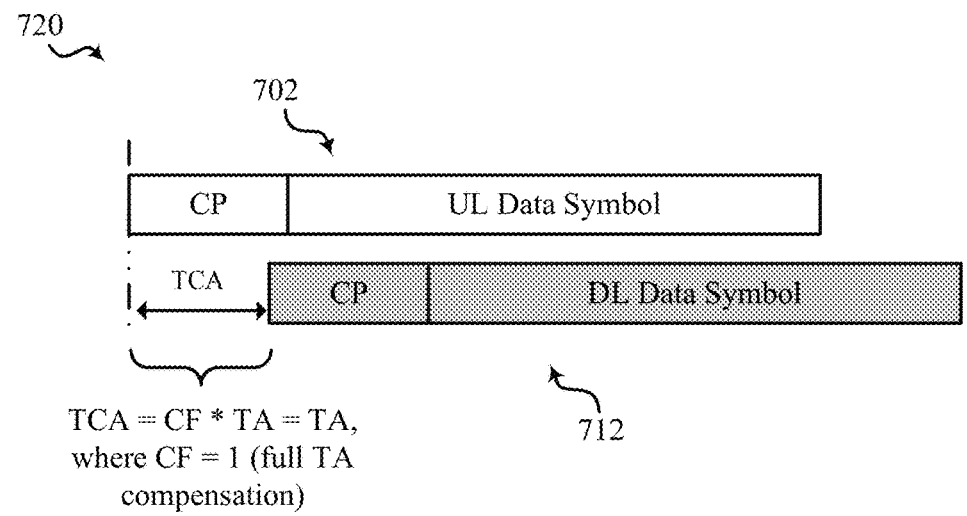
FIG. 7

TECHNIQUES FOR COMPENSATING TIMING ADVANCE FOR FULL DUPLEX COMMUNICATION

CROSS REFERENCE TO RELATED APPLICATION(S)

This application claims the benefit of priority to U.S. Provisional Application Ser. No. 63/021,018, entitled "Techniques for Compensating Timing Advance for Full Duplex Communications" and filed on May 6, 2020, which is expressly incorporated by reference herein in its entirety.

TECHNICAL FIELD

Aspects of the present disclosure relate generally to communication systems, and more particularly, to techniques for timing adjustment for wireless communication. Aspects and features enable and provide timing advancement features for various communication scenarios, including full and half duplex scenarios, that can yield improved communication operations by mitigating and reducing self-interference, providing higher data rates, and signaling associated with timing adjustments.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G NR technologies. 5G NR technologies are a part of a continuous mobile broadband evolution promulgated by Third Generation Partnership Project (3GPP) to meet new requirements associated with latency, reliability, security, scalability (e.g., with Internet of Things (IoT)), and other requirements. 5G NR technologies include services associated with enhanced mobile broadband (eMBB), massive machine type communications (mMTC), and ultra reliable low latency communications (URLLC).

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Due to propagation delays in wireless communications, timing between uplink (UL) communications and downlink (DL) communications may cause UL/DL interference and inter-symbol interference. To correct the propagation delays, a timing advance technique is used by wireless systems which allows a user equipment (UE) to delay or advance UL transmissions by an amount of time based on a timing advance value indicated by a base station. While the timing advance technique is able to correct propagation delays between the bases station and the UE, the timing advance may lead to interference for full duplex communication.

In an aspect of the disclosure, a method, a computer-readable medium, and an apparatus are provided. In some aspects, the method may be performed by a UE. The method may include receiving, from a base station, a timing advance value and a compensation factor. The method may also include determining a timing compensation amount indicating an amount of time to adjust an uplink (UL) transmission based on the timing advance value and the compensation factor. The method may also include transmitting, to the base station, the UL transmission according to the timing compensation amount.

In another aspect of the disclosure, a method, a computer-readable medium, and an apparatus are provided. In some aspects, the method may be performed by a base station. The method may include determining a timing advance value for a UE based on a propagation delay between the base station and the UE. The method may also include determining a compensation factor for the UE to compensate the timing advance value of a UL transmission. The method may also include transmitting the timing advance value and the compensation factor to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 4 includes diagrams of example duplex communications in accordance with aspects of the present disclosure.

FIG. 6 includes diagrams of example timing advance techniques for full duplex communications in accordance with aspects of the present disclosure.

FIG. 7 includes diagrams of example compensation techniques in accordance with aspects of the present disclosure.

DETAILED DESCRIPTION

Figure 1:
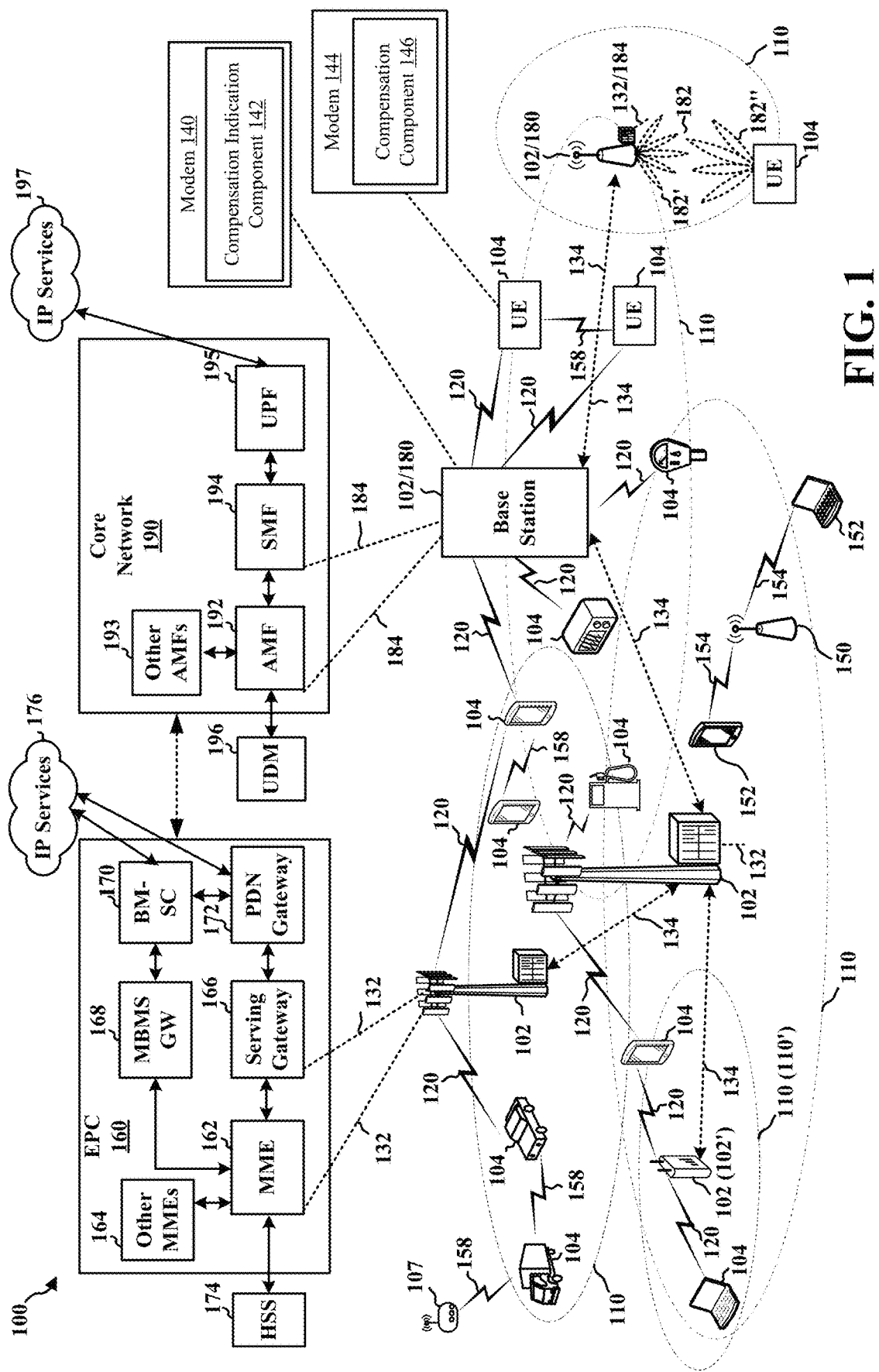
FIG. 1 is a schematic diagram of an example wireless communications system and access network in accordance with aspects of the present disclosure.

The detailed description, set forth below, in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

Timing and synchronous operations are generally impactful for wireless communication networks. In cellular communication systems, due to propagation delay, the timing at which a downlink (DL) signal is transmitted by base station and at which the uplink (UL) signal is received by the base station may exhibit a large delay, hence creating UL/DL interference. Moreover, since the propagation delay from different user equipments (UEs) are typically different, then UL signals transmitted from the different UEs may be different, which may create undesired inter-symbol interference at the base station receiver.

Aspects presented herein aim to aid in mitigation and/or reducing timing and interference challenges for improved device operations and system throughput. To address these challenges, a mechanism called timing advance (TA) was introduced in 4G Long Term Evolution (LTE) technologies and reused in 5G New Radio technologies. In this mechanism, the UE may advance a UL transmission by a certain amount of time that roughly corresponds to twice the propagation delay between the UE and the base station. The TA mechanism allows the base station to indicate a TA value in the unit of multiples of transmission samples (based on e.g., sampling rate, which depends on the subcarrier spacing) through physical DL scheduling channel (PDSCH). After receiving the TA value, the UE may delay or advance a timing of a UL transmission according to the TA value. The TA value is applied starting from a UL transmission that is a timing gap after the receiving of the TA value in the PDSCH.

As explained in further detail herein, the TA mechanism may work for half duplex communication scenarios such as time division duplex (TDD) and frequency division duplex (FDD). Yet generally the TA mechanism may not resolve propagation delays and associated challenges for full duplex communications.

The present disclosure provides numerous techniques for compensating the TA mechanism for full duplex communications. In an example, a UE may compensate for part of a TA value indicated by the base station based on a compensation factor received from the base station. For example, the UE may delay or advance the timing of a UL transmission based on a product of the TA value and the compensation factor or any number between the TA value and the product of the TA value and the compensation factor. In an example, the compensation factor is any number from 0 to 1, accordingly the TA value would be the maximum value for adjusting the timing of a UL transmission.

Turning now to the figures, examples of techniques for compensating the TA mechanism for full duplex communications are depicted. It is to be understood that aspects of the figures may not be drawn to scale and are instead drawn for illustrative purposes.

Referring to FIG. 1, a diagram illustrating an example of a wireless communications system and an access network 100 is provided. The wireless communications system (also referred to as a wireless wide area network (WWAN)) includes base stations 102, UEs 104, an Evolved Packet Core (EPC) 160, and another core network 190 (e.g., a 5G Core (5GC)).

The base station 102 may include a modem 140 having a compensation indication component 142 configured to indicate to the UE 104 a compensation factor for compensating the TA value and/or to indicate UL transmissions for the UE 104 to adjusting transmission timing of based on the compensation factor.

The UE 104 may include a modem 144 having a compensation component 146 configured to compensate a TA value for adjusting a transmission timing of a UL transmission, and transmit the UL transmission based on the timing compensation amount.

In an aspect, the base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or the core network 190) with each other over backhaul links 134 (e.g., X2 interface). Each of the backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. User Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. User Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, UE may also apply to one or more companion devices such as in a device constellation arrangement. One or more of these devices may collectively access the network and/or individually access the network.

Figure 2:
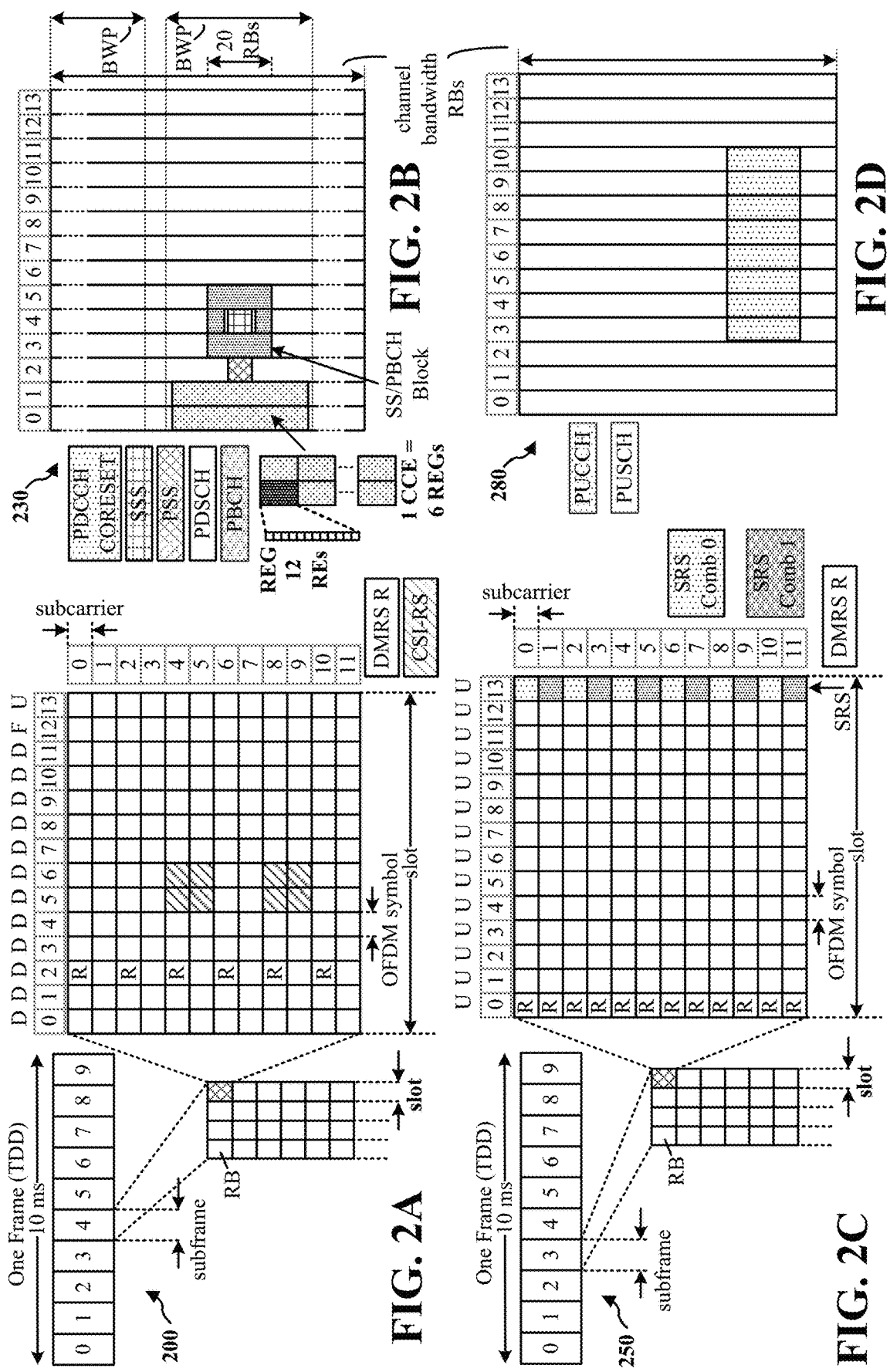
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe.

As illustrated in FIGS. 2A-2D, the 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G NR frame structure that is TDD.

A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
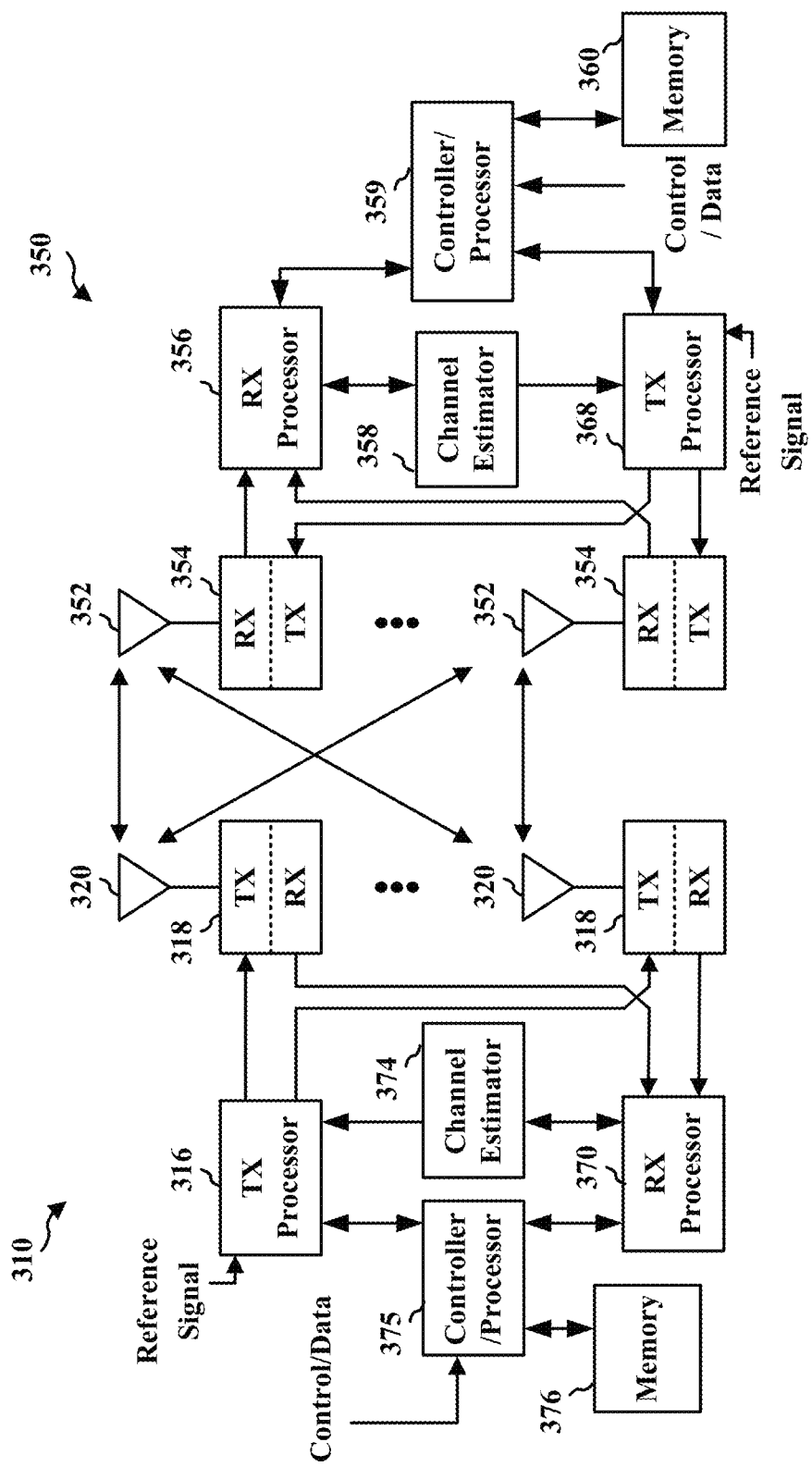
FIG. 3 is a diagram illustrating an example of a base station and UE in an access network in accordance with various aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the compensation indication component 142 of FIG. 1.

At least one of the TX processor 316, the RX processor 370, and the controller/processor 375 may be configured to perform aspects in connection with the compensation indication component 142 of FIG. 1.

Referring to FIG. 4, examples of duplex schemes 400, 410, and 420 used for communications between the base station 102 and the UE 104 (or between these devices and other devices) are disclosed. The first duplex scheme 400 illustrates a time division duplex scheme (TDD) in which a wireless communications device (e.g., the base station 102 or UE 104) receive and transmit signals, such as received signal 402 (or Rx) and transmitted signal 404 (Tx), at different times (but may allow these signals to be received/transmitted on a frequency bandwidth). The duplex scheme 400 also illustrates a guard time 406 that may help to avoid interference in the transmission/reception. The second duplex scheme 410 illustrates a frequency division duplex scheme (FDD) in which a wireless communications device (e.g., the base station 102 or UE 104) receive and transmit signals, such as received signal 412 and transmitted signal 414, on different frequencies (but may allow these signals to be received/transmitted at overlapping times). The duplex scheme 410 illustrates a guard band 416 that spaces the frequency of the reception and transmission and may help to avoid interference. The first duplex scheme 400 and the second duplex scheme 410 are considered half duplex communication (or schemes) as they include a division in time and/or frequency between UL and DL signals. The third duplex scheme 420 illustrates a full duplex scheme in which a device receives and transmit signals at overlapping times and in a same frequency range, such as in reception resources 422 and transmission resources 424.

For full duplex (e.g., in-band fullduplex (IBFD)), the reception resources 422 and the transmission resources 424 occupy (fully or partially) the same physical resource which results in self-interference from transmission to reception. The example duplex schemes 420, 430, and 440 illustrate various modes of full-duplex communication. Full-duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the overlapping Tx/Rx nature of full-duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

The duplex schemes 420 and 430 illustrate examples of IBFD resources. Duplex scheme 440 illustrates an example of sub-band full-duplex resources. In IBFD, signals may be transmitted and received in overlapping times and overlapping in frequency. As shown in the example duplex scheme 430, a time and a frequency allocation of resources for transmission 432 may fully overlap with a time and a frequency allocation of resources for reception 434. In the example duplex scheme 420, a time and a frequency allocation of transmission resources 424 may partially overlap with a time and a frequency of allocation of reception resources 422.

IBFD is in contrast to sub-band FDD, where uplink and downlink resources may overlap in time using different frequencies, as shown in the example duplex scheme 440, where the transmission resources 442 are separated from the reception resources 444 by a guard band 426. The guard band may be frequency resources, or a gap in frequency resources, provided between the transmission resources 442 and the reception resources 444. Separating the transmission frequency resources and the reception frequency resources with a guard band may help to reduce self-interference. UL resources and a reception resources that are immediately adjacent to each other correspond to a guard band width of 0. As an output signal, e.g., from a UE transmitter may extend outside the UL resources, the guard band may reduce interference experienced by the UE. Sub-band FDD may also be referred to as "flexible duplex". The full duplex scheme may be adopted by the base station 102, the UE 104, or both of these devices.

In cellular communication systems, due to propagation delay, there may be a difference between the time at which a DL signal is transmitted by the base station 102 and at which the DL signal is received by the UE 104. Similarly, there may be a delay between the time at which the UE transmits an UL signal and the time at which the base station receives the UL signal. The time delay, or propagation delay, may create an uplink/downlink conflict over overlap in time. As the propagation delay from different UEs 104 may be different, e.g., based on different locations, etc., the UL signals transmitted by different UEs 104 may arrive at the base station 102 at a different times. The different delay in the uplink signals may create undesired inter-symbol interference for reception at the base station 102. The base station and UE may implement a timing advance (TA) mechanism to reduce such interference at the base station due to propagation delay.

The UE 104 may advance an UL transmission by an amount of time corresponding to a timing advance value, e.g., in order to compensate for the propagation delay between the UE and the base station. In some aspects, the amount of time that the UE advances the UL transmission may correspond to twice the propagation delay between the UE 104 and the base station 102. In some aspects, the base station 102 may indicate the timing advance value to the UE for the UE to use when transmitting the UL transmission. In some aspects, the base station may indicate the timing advance value in a unit based on multiples of transmission samples. In some aspects, the base station may indicate the timing advance value based on a sampling rate, which may depend on the subcarrier spacing. In some examples, the base station may indicate the timing advance value to the UE through a medium access media access control (MAC) control element (CE) (MAC-CE) in a PDSCH. After receiving the timing advance value, the UE 104 may apply the timing advance value by delaying or advancing the timing of the uplink transmission according to the timing advance value. The UE may begin applying the indicated timing advance value starting from a UL transmission that occurs at least a time gap (e.g., $T_{gap}$) after receiving the timing advance value in the PDSCH.

Figure 5:
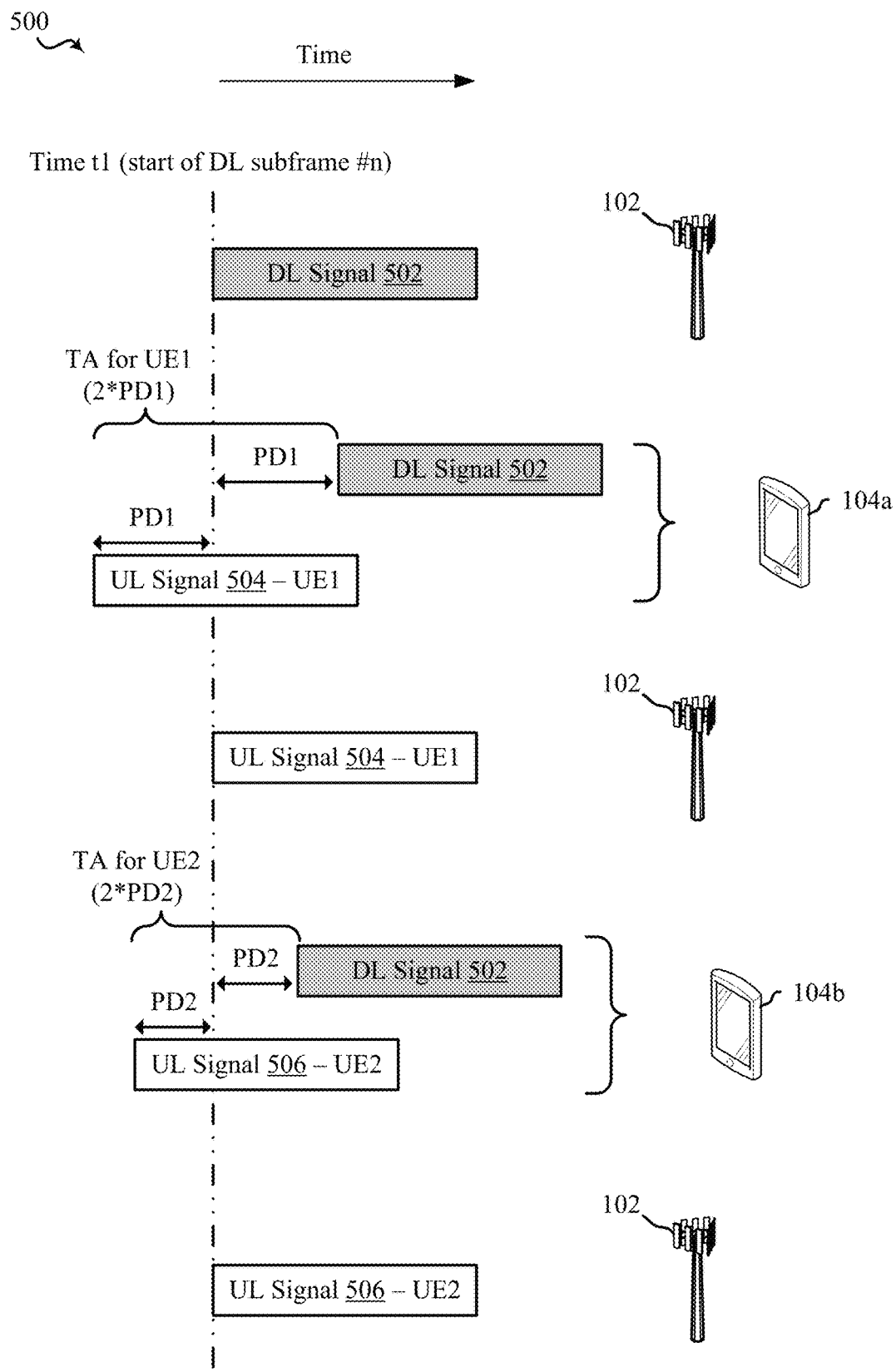
FIG. 5 includes diagrams of example propagation delays and timing advance techniques in accordance with aspects of the present disclosure.

FIG. 5 illustrates a diagram 500 showing example aspects of propagation delay and timing advance between a base station and one or more UEs. In this example, the base station 102 may transmit a DL signal 502 to a first UE 104a and a second UE 104b, where the first UE 104a is located further from the base station 102 than the second UE 104b. The DL signal 502 may be transmitted at a time t1 which is the start of the DL subframe #n, n being any whole number. The first UE 104a may receive the DL signal 502 with a propagation delay PD1. A timing advance may be used for the first UE 104a to adjust the timing of the UL transmission 504 based on a first timing advance value TA1 which is double the propagation delay PD1.

The second UE 104b may receive the DL signal 502 with a propagation delay PD2, which is less than PD1 (due to the second UE 104b being closer to the base station 102 than the first UE 104a). A timing advance may be used to adjust the UL transmission 506 based on a second timing advance value TA2 which is double the propagation delay PD2.

By adjusting the UL transmission 504 of the first UE 104a by the first timing advance value TA1 and adjusting the UL transmission 506 of the second UE 104b by the second timing advance value TA2, the first UE 104a transmits the UL transmission 504 at time t1+TA1 and the second UE 104b transmits the UL transmission 506 at time t1+TA2, which allows both UL transmissions to be received by the base station 102 with timing alignment for the UL and DL subframes. If the timing advances TA1 and TA2 are not applied by the UEs 104a and 104b, the UL transmissions 504 and 506 may overlap causing interference at the base station 102.

FIG. 6 illustrates example time diagrams 600 and 610 showing example effects of timing advance techniques for full duplex communication. In an aspect, an UL signal 602 may include a cyclic prefix (CP) value and a UL data symbol, and a DL signal 612 may include the CP length and a DL data symbol. In some aspects, when the UE 104 applies a timing advance value, e.g., to compensate for propagation delay with the base station, the UL and DL symbols may be misaligned at the UE 104, where the UL symbol is earlier transmitted earlier than the DL symbol. The time difference may be equal to the timing advance value.

When the timing advance value is less than a cyclic prefix length (e.g., TA value<CP length), as illustrated in diagram 600, the receiver at the UE may be able to cancel self-interference caused at the UE by the UE's UL transmission. The self-interference may be due to reception of at least some of the UL transmission at the UE's receiver along with the downlink transmission.

However, when the timing advance value is larger than the cyclic prefix length (e.g., the TA value>CP length), as illustrated by the diagram 610, the UE may still experience inter-symbol-interference after the UE performs self-interference cancellation. For example, when the UE 104 transmits and receives at an overlapping time, the transmitted signal may be received by the UE's receiver (e.g., the receiver of the UE 104 will receive the UL signal transmitted by the transmitter of the UE 104) causing self-interference. As the UE 104 may transmit data on the transmitted signal, the UE 104 may cancel out the transmitted data of the UL signal from the received DL signal. The cancellation may apply, e.g., if the misalignment between UL and DL signals happens within a cyclic prefix (i.e., TA value<CP length). When the misalignment happens during the data symbol (i.e., TA value>CP length), the timing misalignment may cause inter-symbol interference to the UE's reception, which the UE 104 may not be able to cancel.

As a consequence of the misalignment when the timing advance is greater than the CP length, as described herein, a coverage area of the base station in which the UE 104 can operate in a full-duplex mode may be limited. As the TA value may be twice the propagation delay, and the TA value is to be smaller than the CP length for the UE 104 to be able to cancel the self-interference, two times the propagation delay being smaller than the CP length translates into a limited coverage area within which the UE 104 is able operate with full duplex.

The present disclosure describes several techniques for compensating timing adjustment values used in communication operations. In some aspects, TA value adjustment enables extension of cell coverage for full duplex communications for the UE 104. Not only does this benefit device performance for improved user experience, improvements in system throughput are also achievable. As discussed herein, TA adjustments can vary across a range of values and/or states (e.g., from partial or full) as may be desired for communication operations.

FIG. 7 illustrates example compensation techniques 700, 710, and 720 that enable the UE to improve full duplex communication by applying a partial timing advance adjustment for uplink transmissions to the base station. In an aspect, the UE 104 may apply a timing compensation amount (TCA) based on a TA value indicated by the base station 102 and a compensation factor ($\alpha$). The timing compensation amount may correspond to an adjusted timing advance value after application of the compensation factor, in some aspects.

Figure 10:
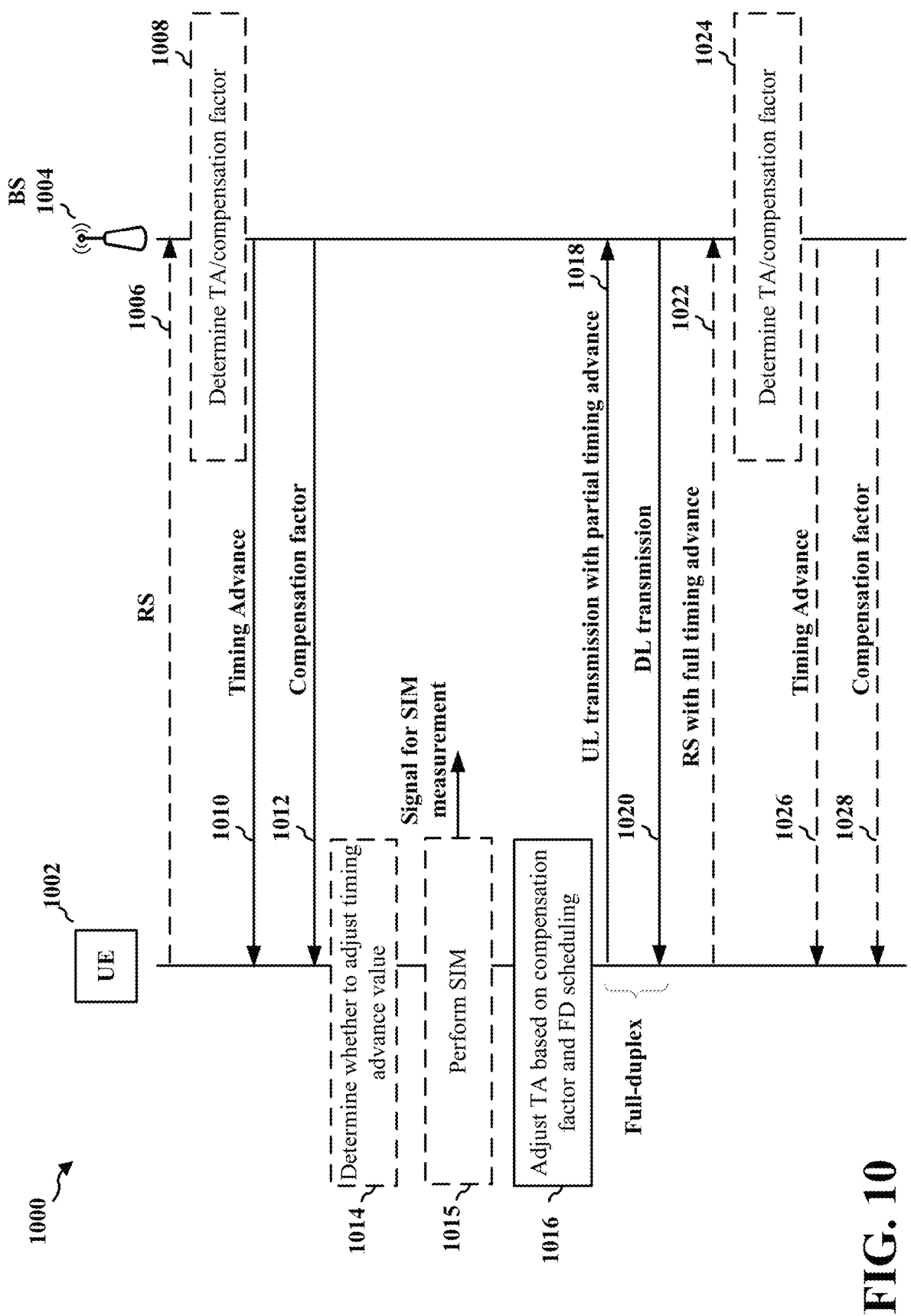
FIG. 10 illustrates a communication flow between a UE and a base station in accordance with aspects of the present disclosure.

In some aspects, the UE may receive an indication of the compensation factor from the base station. FIG. 10 illustrates an example communication flow 1000 between a UE 1002 and a base station 1004 in which the base station indicates a timing advance 1010 and a compensation factor 1012 to the UE. Although the timing advance and compensation factor 1012 are illustrated with separate lines, they may both be transmitted in a same message to the UE or may be transmitted in separate messages to the UE. The base station may determine the timing advance value and/or the compensation factor for the UE, at 1008, based on reception of one or more uplink signals from the UE 1002. For example, the base station 1004 may determine the timing advance and/or the compensation factor based on reception of an uplink reference signal 1006 from the UE 1002, in some aspects. The compensation factor (e.g., which may be represented by $\alpha$) may be a number between 0 and 1 (e.g., $\alpha$ may be a value of any of $\{0, 0.25, 0.5, 0.75, 1\}$). The term compensation factor is merely an example name for a, and this factor may be referred to by parameter name.

In an example, the UE may determine a timing compensation amount (TCA) based on the timing advance 1010 and the compensation factor 1012. As an example, the Timing compensation amount may be a product of the timing advance value 1010 and the compensation factor 1012. For example, if $\alpha=0$, the UE may apply no timing advance compensation, e.g., based on 0*TA=0. If $\alpha=1$, the UE may apply a full timing compensation, e.g., based on 1*TA=TA. As example, in some aspects, the compensation factor may include an indication from the base station to the UE about whether or not to apply the timing advance to an uplink signal. For example, the base station may indicate the compensation factor as a yes/no or enabled/disabled type of indication rather than a 0 or 1, in some aspects. If the compensation factor is between 0 and 1, e.g., having a fractional value, the UE may apply a partial timing advance compensation, e.g., by applying a partial timing advance value to the UL transmission 1018. As illustrated at 1016, the UE may first determine an adjusted timing advance value, e.g., a timing compensation amount, based on the timing advance 1010 and the compensation factor 1012 received from the base station 1004. Then, the UE may apply the adjusted timing advance value, e.g., the timing compensation amount, to adjust the timing of the UL transmission 1018.

The example compensation technique 700 in FIG. 7 illustrates that if the compensation factor is between 0 and 1, the timing compensation amount of the DL signal 712 may be less than the timing advance value, thereby the timing compensation amount TCA would be less than the CP length. This may result in the UL signal 702 being transmitted within the CP length ahead of the reception of the DL signal 712, and may enable the UE 1002 to perform self-interference cancellation of the uplink transmission from the downlink reception at the UE in a full-duplex operation or mode.

In an example, the UE 1002 may either advance the UL transmission by the partial timing advance compensation amount that is a product of the compensation factor and the timing advance value (e.g., TA*$\alpha$). In other aspects, the UE 1002 may advance the UL transmission by any value between the partial timing advance compensation amount (e.g., TA*$\alpha$) and the indicated timing advance value. In this example, the UE may apply a timing advance between the values $\{(TA*\alpha), TA\}$ In this example, the configured compensation factor may provide a lower bound on the amount time that the UE 1002 adjusts the timing advance value of the uplink transmission and may place a bound on the amount of self-interference cancellation the UE 1002 is able to perform.

As illustrated by the example 710, when the compensation factor equals 0, e.g., $\alpha=0$, the adjusted timing advance may correspond to no timing advance. In this example, the UE 1002 may determine that no timing advance compensation is needed to adjust timing for the UL signal 702, and may transmit the UL transmission 702 with no timing compensation amount TCA. As illustrated by the example 720, if the compensation factor equals 1, e.g., $\alpha=1$, the UE 1002 may determine that a full timing advance compensation is to be applied to adjust (or advance) the UL signal 702. The UE may apply the timing compensation amount TCA that is set to the full timing advance value to adjust the timing of the UL signal 702.

As illustrated at 1014, the UE may further determine whether to apply an adjusted (or compensated) timing advance for the UL transmission 1018. The UE 1002 may apply an adjusted timing advance based on a condition being met, in some aspects. In an aspect, the UE 1002 may apply a partial timing advance compensation (e.g., timing compensation amount TCA=partial timing advance compensation) based on at least one of several options. For example, the UE 1002 may apply the partial timing advance compensation to the UL transmission 1018 if the UE 1002 is configured for full duplex communication (e.g., if UE 1002 has been scheduled for transmission and reception that overlaps in time within a shared frequency range). FIG. 10 illustrates an example in which the UL transmission 1018 is transmitted in a full-duplex mode that overlaps with reception of the downlink signal 1020. In this example, the UE 1002 may apply a timing compensation amount TCA equal to a full timing advance compensation (e.g., $\alpha=1$) if the UE 1002 is scheduled for UL transmission in a half-duplex mode, e.g., without an overlapping downlink reception.

In another example, the UE 1002 may determine to apply a compensated timing advance based on a particular DCI format. As an example, if the UE receives a first DCI format associated with full duplex mode, the UE may apply a partial or adjusted timing advance value, e.g., a timing advance compensation, to adjust the timing of the uplink transmission. If the UE receives a second DCI format associated with half-duplex mode, the UE may apply a full timing advance value to adjust the timing of the uplink transmission. If a transmission of the UE 1002 is scheduled with the first DCI format for full duplex, then the UE 1002 may apply a compensation factor associated with the first DCI format resulting in a partial timing advance compensation (e.g., $0<\alpha<1$ and TCA=$\alpha$*TA), and if the transmission of the UE 1002 is scheduled with the second DCI format for half duplex mode, then the UE 1002 may apply full timing advance compensation (e.g., $\alpha=1$ and TCA=TA).

In another example, the UE 1002 may apply a partial timing advance compensation for UL transmissions, regardless of whether a particular UL transmission is scheduled to overlap with a DL reception or not. This second option provides simplicity for the UE 1002 to determine when to apply the partial timing advance compensation.

When the UE 1002 is configured with the compensation factor for a partial timing advance compensation, the UE 1002 may continue to apply a full timing advance compensation to at least some uplink signals. As an example, the UE may apply a full time advance value (e.g., corresponding to α=1) when transmitting a reference signal 1022. In some aspects, the reference signal may be a sounding reference signal (SRS) or other uplink reference signal. The base station 1004 may receive the reference signals and use the reference signals to estimate an actual timing difference between the UE 1002 and the base station 1004. The base station 1004 may update one or more of the timing advance value or the compensation factor, at 1024, based on timing information obtained based on the reference signal 1022. FIG. 10 illustrates that the base station 1004 may indicate the updated timing advance 1026 and/or compensation factor 1028 to the UE 1002, which the UE may apply similar to the aspects discussed in connection with 1014, 1016, and 1018.

In an aspect, the base station 1004 may transmit, or otherwise indicate, the compensation factor 1012 to the UE 1002 in one or more of a radio resource control (RRC) message, a control element (CE) message (e.g., medium access control-control element (MAC-CE), or a DCI.

In an aspect, the UE 1002 may receive the compensation factor 1012 from the base station 1004 via a group-common DCI that dynamically indicates the compensation factor for the UE 1002 to use. A group-common DCI is a type of DCI format used by the base station 1004 to indicate a set of control commands to a group of multiple UEs 1002. The group-common DCI may be signaled by the base station 1004 such that either (a) the group of UEs receives the same control command, and UEs within the group apply the same operation based on the control command, or (b) the group-common DCI comprises multiple control fields, where each field is directed to a particular UE 1002 of the group of UEs.

In some aspects, the UE 1002 may receive a configuration from the base station 1004 for multiple timing advance loops, where different compensation factors (e.g., different α) are configured for each of the multiple timing advance loops. The base station 1004 may then indicate a particular timing advance loop for the UE 1002 to use. The UE 1002 may determine the compensation factor to apply for an UL transmission to be a compensation factor associated with a particular timing advance loop. For example, the timing advance loops and/or compensation factors may be configured by an RRC message from the base station 1004, and a DCI from the base station 1004 may indicate one of the RRC configured timing advance loops for the UE to apply the corresponding compensation factor.

Figure 8:
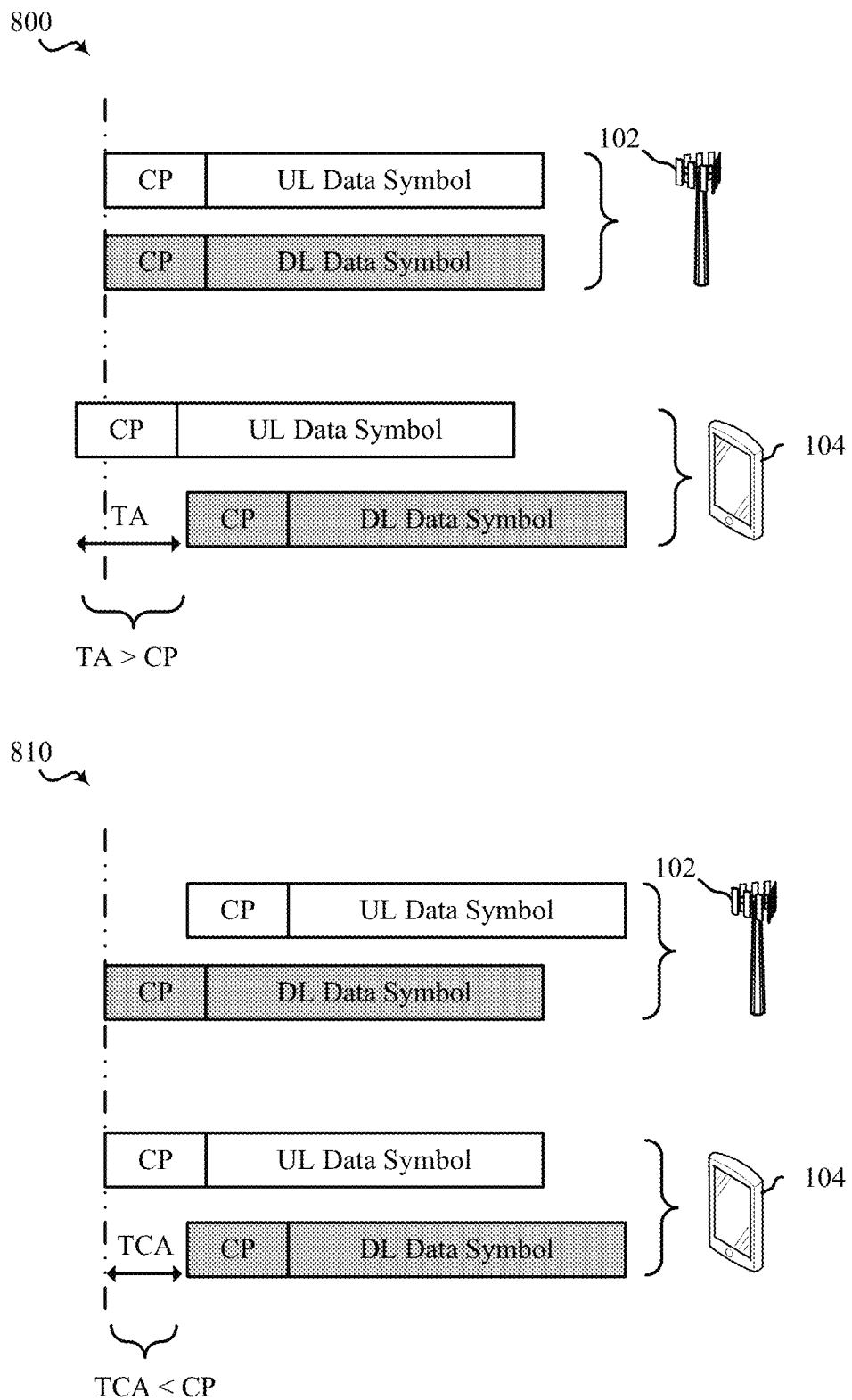
FIG. 8 includes additional diagrams of example compensation techniques in accordance with aspects of the present disclosure.

FIG. 8 illustrates timing diagram 800 showing uplink/downlink alignment at a base station due to a timing advance applied at the UE, and a corresponding misalignment at the UE for uplink/downlink based on application of the timing advance for the uplink transmission from the UE. As illustrated in diagram 800, the timing advance may align the UL signals and DL signals at the base station 1004, however, as the timing advance value is greater than the CP at the UE 1002, the UE 1002 may not be able to operate in full duplex mode. For example, the UE may not be able to operate in a full-duplex mode because the propagation delay is greater than CP/2 (i.e., half of the length of the CP), which may lead to self-interference at the UE.

In contrast, the diagram 810 provides a way for the UL/DL timing difference at both the base station 102 and the UE 104 to be less than the CP length, allowing both the base station 102 and the UE 104 to cancel the signal interference. In other words, the timing advance compensation technique shown in 810 allows the UE 104 to adjust the timing of its uplink transmission according to a partial timing advance compensation (e.g., 0<α<1). The partial timing advance may allow the UE 104 to operate at full duplex when the propagation delay is greater than CP/2 but less than CP. Based on an application of a partial timing advance compensation, as described herein, an operating broadcast area of a base station 102 can be expanded from a more limited broadcast area. Without the aspects presented herein, the broadcast area for the base station may be limited to coverage for a timing advance value of less than the CP.

Figure 9:
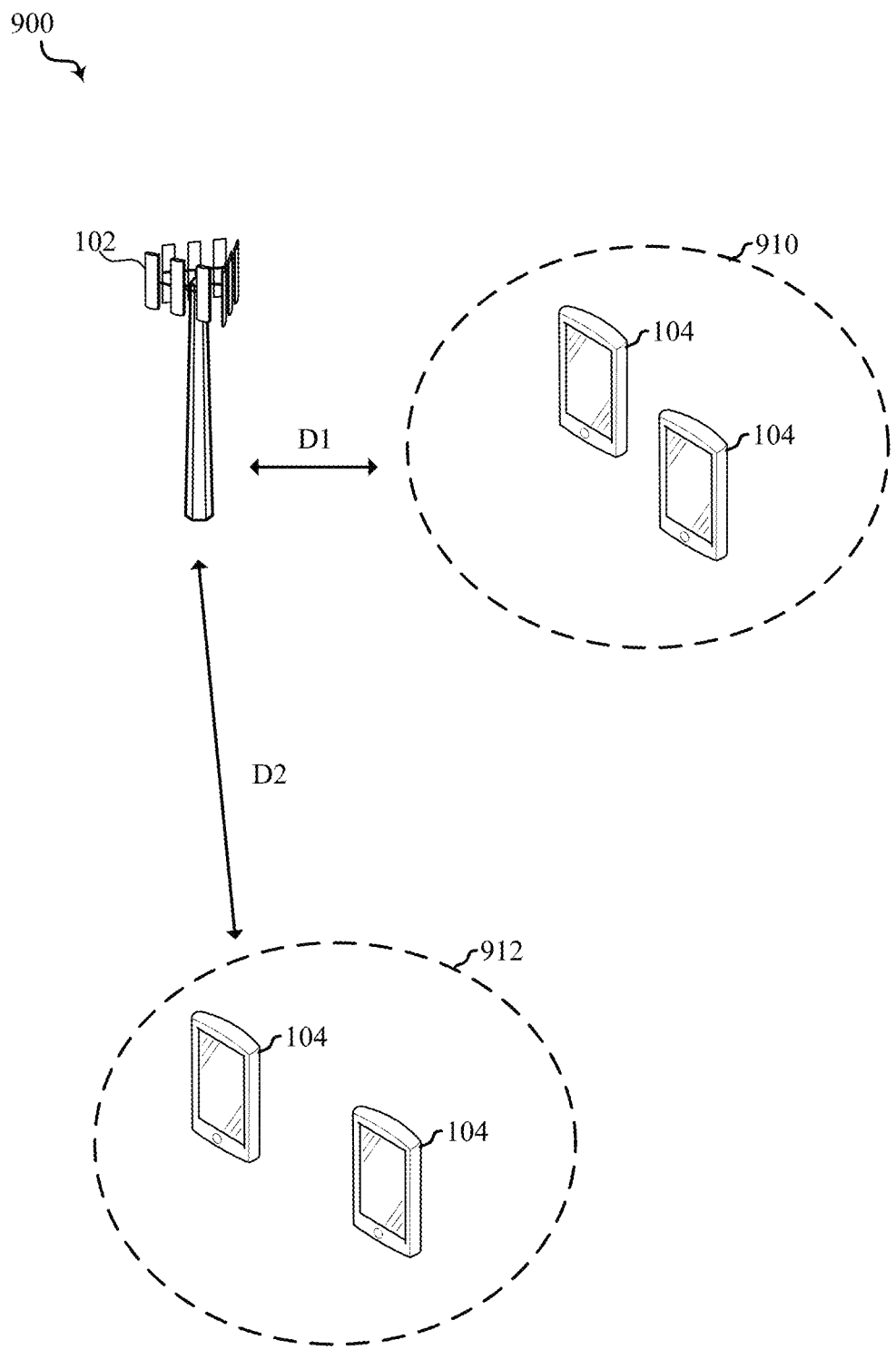
FIG. 9 is an additional diagram of example compensation techniques in accordance with aspects of the present disclosure.

FIG. 9 illustrates an example diagram 900 in which a base station 102 may communicate with a plurality of UEs 104. A first group 910 of UEs 104 may be located at a distance range D1 from the base station 102, and a second group 912 of UEs 104 may be located at a distance range D2 from the base station 102, where D2 is greater than D1. In an example, if each of the plurality of UEs 104 apply a same ratio of a partial TA compensation, the UL transmissions from the plurality of UEs 104 may be received by the base station 102 at different times. Further, if the UL transmissions are scheduled on a shared set of data symbols, then inter-UE interference may occur. Accordingly, the base station 102 may group the UEs 104 based on the distances D1 and D2 from the base stations and configure the first group 910 and the second group 912 of UEs 104 with a compensation factor. For example, the first group 910 of UEs 104 may have a first compensation factor equal to a first amount (e.g., 1) and the second group 912 of UEs 104 may have a second compensation factor equal to a second amount (e.g., 0.5). By grouping the UEs by distance, the base station 102 may schedule UL transmissions from UEs 104 of a particular group based on a shared timing (e.g., to overlap in time or to be at the same time), without experiencing inter-UE interference. For example, the base station 102 may schedule UL transmissions from the UEs 104 of the first group 910 at a first time and schedule UL transmissions from the UEs 104 of the second group 912 at a second time, thereby avoiding inter-UE interference.

Figure 11:
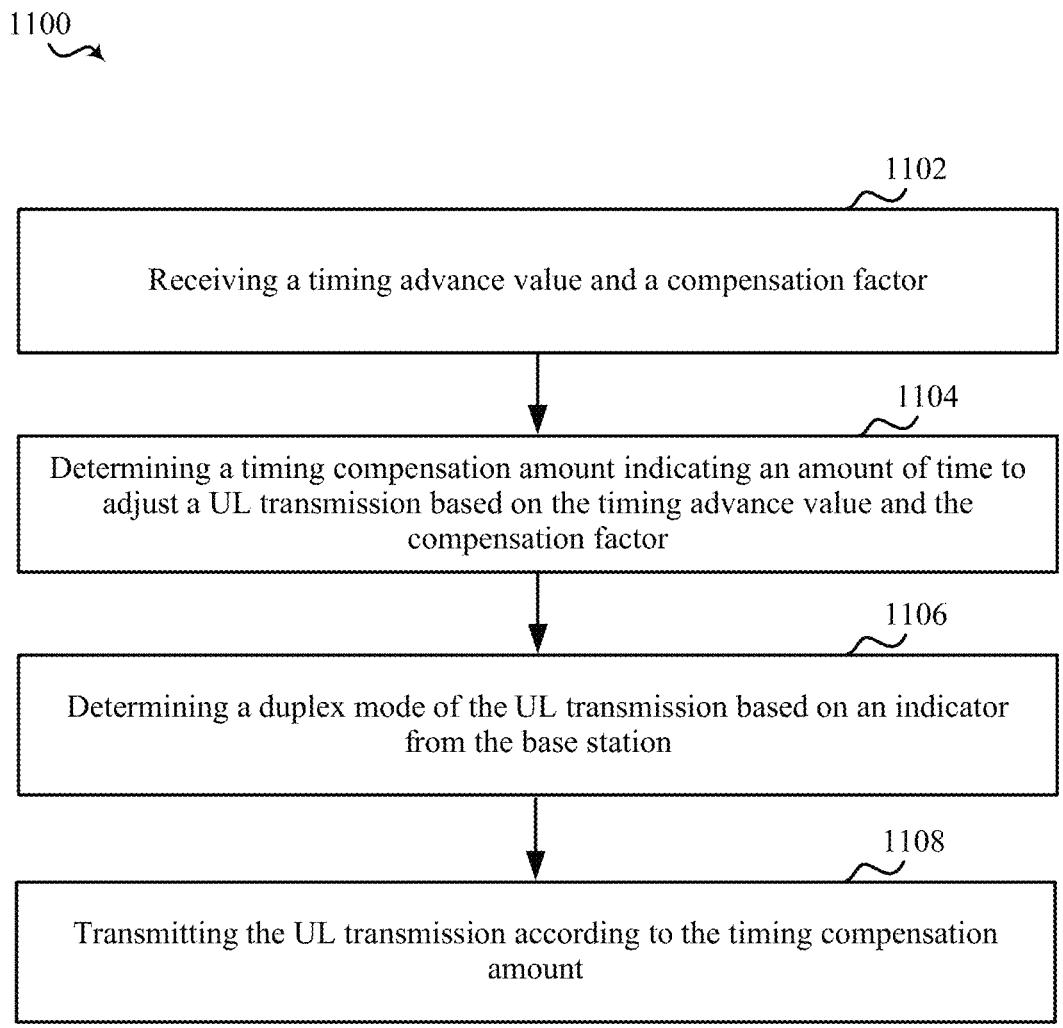
FIG. 11 is a flowchart of an example method of wireless communications by the UE of FIG. 1 in accordance with aspects of the present disclosure.

Referring to FIG. 11, an example method of wireless communications is illustrated. The method 1100 may be performed by the UE 104 along with any of the components (see e.g., FIG. 12) of the UE 104. For example, the method 1100, may be performed by one or more of a processor 1212, a transceiver 1202, the modem 144, the compensation component 146, and/or one or more additional components/subcomponents of the UE 104. One or more aspects illustrated in FIG. 11 may be optional. Various implementations may include a method with any combination of the aspects described in connection with FIG. 11.

Turning to FIG. 11, at 1102, the method 1100 may include receiving, from the base station, a timing advance value and a compensation factor. For example, one or more of the processor 1212, the transceiver 1202, the modem 144, the compensation component 146, and/or one or more components/subcomponents of the UE 104 may be configured to receive, from the base station 102, a timing advance value and a compensation factor. Thus, the processor 1212, the transceiver 1202, the modem 144, the compensation component 146, and/or one or more components/subcomponents of the UE 104 may define the means for receiving, from the base station 102, a timing advance value and a compensation factor.

In an example, the compensation factor is received from the base station 102 by one of an RRC message, a CE (e.g., MAC CE) message, or a DCI.

In an example, the method 1100 may also include receiving, from the base station 102, an indication on which timing advance loop to apply the timing compensation amount, wherein the transmitting the UL transmission according to the timing compensation amount is based on the indication.

In an example, the compensation factor is a real number between 0 and 1.

At 1104, the method 1100 may also include determining a timing compensation amount indicating an amount of time to adjust a UL transmission based on the timing advance value and the compensation factor. For example, one or more of the processor 1212, the transceiver 1202, the modem 144, the compensation component 146, and/or one or more components/subcomponents of the UE 104 may be configured to determine a timing compensation amount TCA indicating an amount of time to adjust a UL transmission based on the timing advance value TA and the compensation factor. Thus, the processor 1212, the transceiver 1202, the modem 144, the compensation component 146, and/or one or more components/subcomponents of the UE 104 may define the means for determining the timing compensation amount based on the timing advance value and the compensation factor.

In an example, the timing compensation amount TCA may be a partial value of the timing advance value received from the base station and a product of the timing advance value TA and the compensation factor. In another example, the timing compensation amount TCA may be a value between the timing advance value TA and the product of the timing advance value TA and the compensation factor, selected by the UE 104. In some examples, the timing compensation amount TCA may be determined further based on a self-interference value.

In an example, the method 1100 may also include determining the UE 104 is configured for full duplex communications, wherein the transmitting the UL transmission according to the timing compensation amount is in response to the determining the UE is configured for full duplex communications.

In an example, the method 1100 may also include receiving, from the base station, a reference signal indicating for the UE to apply the timing compensation amount to the UL transmission, wherein the transmitting the UL transmission according to the timing compensation amount is in response to the receiving the reference signal.

At 1106, the method 1100 may optionally include determining a duplex mode of the UL transmission based on an indicator from the base station. For example, one or more of the processor 1212, the transceiver 1202, the modem 144, the compensation component 146, and/or one or more components/subcomponents of the UE 104 may be configured to determine a duplex mode of the UL transmission based on an indicator from the base station 102. Thus, the processor 1212, the transceiver 1202, the modem 144, the compensation component 146, and/or one or more components/subcomponents of the UE 104 may define the means for determining a duplex mode of the UL transmission based on an indicator from the base station 102. In an example, the timing compensation amount may be less than the timing advance value in response to the determining the duplex mode is a full duplex mode, and the timing compensation amount value may be equal to the timing advance value in response to the determining the duplex mode is a half-duplex mode.

At 1108, the method 1100 may include transmitting, to the base station, the UL transmission according to the timing compensation amount. For example, one or more of the processor 1212, the transceiver 1202, the modem 144, the compensation component 146, and/or one or more components/subcomponents of the UE 104 may be configured to transmit, to the base station 102, the UL transmission according to the timing compensation amount. Thus, the processor 1212, the transceiver 1202, the modem 144, the compensation component 146, and/or one or more components/subcomponents of the UE 104 may define the means for transmitting, to the base station 102, the UL transmission according to the timing compensation amount.

Figure 12:
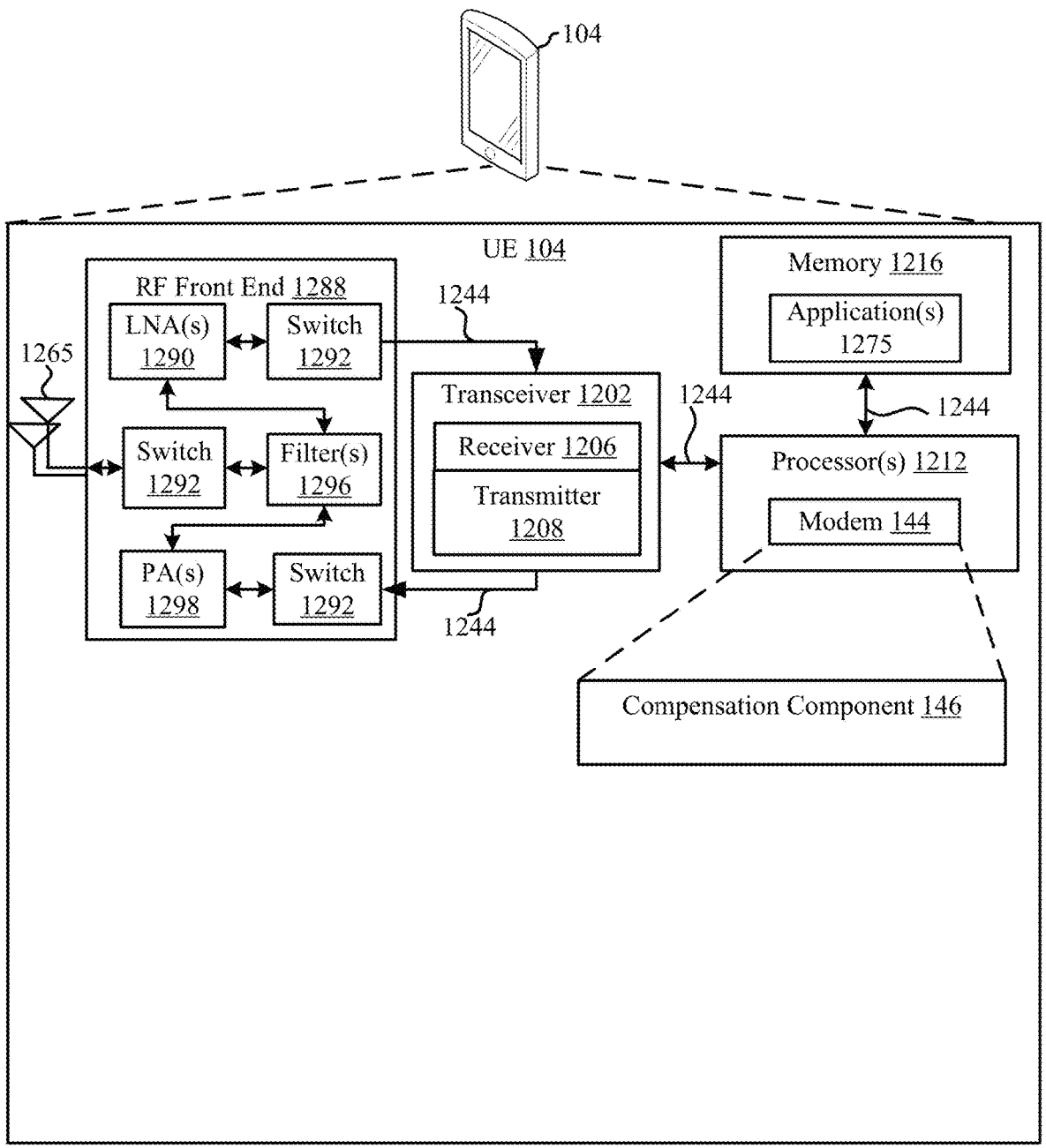
FIG. 12 is a schematic diagram of an example of the UE of FIG. 1 in accordance with aspects of the present disclosure.

Referring to FIG. 12, one example of an implementation of the UE 104 may include a variety of components, some of which have already been described above, but including components such as one or more processors 1212, memory 1216, and transceiver 1202 in communication via one or more buses 1244, which may operate in conjunction with the modem 144 to enable one or more of the functions of the method 1100 described herein. The one or more processors 1212, modem 144, memory 1216, the transceiver 1202, RF front end 1288 and one or more antennas 1265, may be configured to support voice and/or data calls (simultaneously or non-simultaneously) in one or more radio access technologies.

In an aspect, the one or more processors 1212 may include the modem 144 that uses one or more modem processors. The various functions related to the compensation component 146 may be included in the modem 144 and/or the processors 1212 and, in an aspect, may be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with the transceiver 1202. In other aspects, some of the features of the one or more processors 1212 and/or the modem 144 may be performed by the transceiver 1202.

Also, the memory 1216 may be configured to store data used herein and/or local versions of applications 1275 or the compensation component 146 and/or one or more of its subcomponents being executed by the at least one processors 1212. The memory 1216 may include any type of computer-readable medium usable by a computer or the at least one processor 1212, such as random access memory (RAM), read only memory (ROM), tapes, magnetic discs, optical discs, volatile memory, non-volatile memory, and any combination thereof. In an aspect, for example, the memory 1216 may be a non-transitory computer-readable storage medium that stores one or more computer-executable codes defining the compensation component 146 and/or one or more of its subcomponents, and/or data associated therewith, when the UE 104 is operating the at least one processor 1212 to execute the compensation component 146 and/or one or more of its subcomponents.

The transceiver 1202 may include at least one receiver 1206 and at least one transmitter 1208. The receiver 1206 may include hardware, firmware, and/or software code executable by a processor for receiving data, the code comprising instructions and being stored in a memory (e.g., computer-readable medium). The receiver 1206 may be, for example, a radio frequency (RF) receiver. In an aspect, the receiver 1206 may receive signals transmitted by at least one of the base station 102 or another UE 104. Additionally, the receiver 1206 may process such received signals, and also may obtain measurements of the signals, such as, but not limited to, Ec/Io, SNR, RSRP, RSSI, etc. The transmitter 1208 may include hardware, firmware, and/or software code executable by a processor for transmitting data, the code comprising instructions and being stored in a memory (e.g., computer-readable medium). A suitable example of the transmitter 1208 may include, but is not limited to, an RF transmitter. The transceiver 1202, receiver 1206, and/or transmitter 1208 may be configured to operate in mmW frequencies and/or near mmW frequencies.

Moreover, in an aspect, the UE 104 may include the RF front end 1288, which may operate in communication with one or more antennas 1265 and the transceiver 1202 for receiving and transmitting radio transmissions, for example, wireless communications received by the UE 104 or wireless transmissions transmitted by the UE 104. The RF front end 1288 may be connected to the one or more antennas 1265 and may include one or more low-noise amplifiers (LNAs) 1290, one or more switches 1292, one or more power amplifiers (PAs) 1298, and one or more filters 1296 for transmitting and receiving RF signals.

In an aspect, the LNA 1290 may amplify a received signal at a desired output level. In an aspect, each of the LNAs 1290 may have a specified minimum and maximum gain values. In an aspect, the RF front end 1288 may use the one or more switches 1292 to select a particular LNA 1290 and its specified gain value based on a desired gain value for a particular application.

The one or more PA(s) 1298 may be used by the RF front end 1288 to amplify a signal for an RF output at a desired output power level. In an aspect, each of the PAs 1298 may have specified minimum and maximum gain values. In an aspect, the RF front end 1288 may use the one or more switches 1292 to select a particular PA 1298 and its specified gain value based on a desired gain value for a particular application.

Also, for example, the one or more filters 1296 may be used by the RF front end 1288 to filter a received signal to obtain an input RF signal. Similarly, in an aspect, for example, a respective filter 1296 may be used to filter an output from a respective PA 1298 to produce an output signal for transmission. In an aspect, each of the filters 1296 may be connected to a specific LNA 1290 and/or PA 1298. In an aspect, the RF front end 1288 may use the one or more switches 1292 to select a transmit or receive path using a specified filter 1296, LNA 1290, and/or PA 1298, based on a configuration as specified by the transceiver 1202 and/or the processor 1212.

As such, the transceiver 1202 may be configured to transmit and receive wireless signals through the one or more antennas 1265 via the RF front end 1288. In an aspect, the transceiver 1202 may be tuned to operate at specified frequencies such that the UE 104 may communicate with, for example, base station 102, one or more cells associated with one or more of the base stations 102, or one or more other UEs 104. In an aspect, for example, the modem 144 may configure the transceiver 1202 to operate at a specified frequency and power level based on the UE 104 configuration of the UE 104 and the communication protocol used by the modem 144.

In an aspect, the modem 144 may be a multiband-multimode modem, which may process digital data and communicate with the transceiver 1202 such that the digital data is sent and received using the transceiver 1202. In an aspect, the modem 144 may be multiband and be configured to support multiple frequency bands for a specific communications protocol. In an aspect, the modem 144 may be multimode and be configured to support multiple operating networks and communications protocols. In an aspect, the modem 144 may control one or more components of the UE 104 (e.g., RF front end 1288, transceiver 1202) to enable transmission and/or reception of signals from the network based on a specified modem configuration. In an aspect, the modem configuration may be based on the mode of the modem 144 and the frequency band in use. In another aspect, the modem configuration may be based on UE configuration information associated with the UE 104 as provided by the network during cell selection and/or cell reselection.

Figure 13:
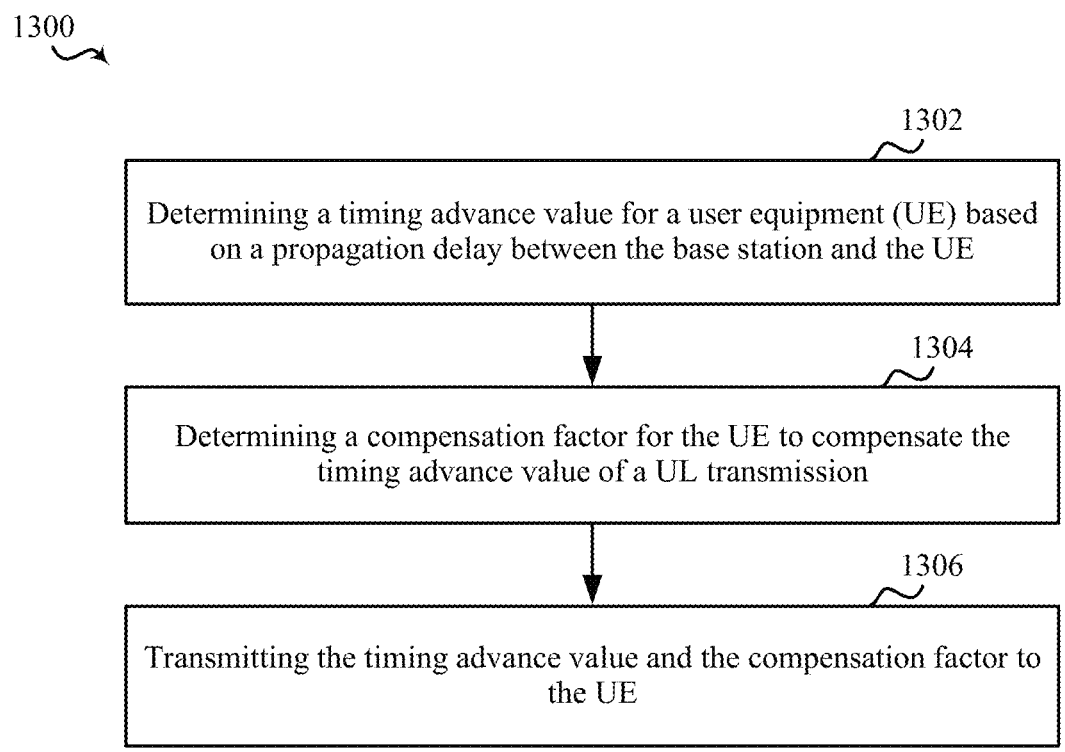
FIG. 13 is a flowchart of an example method of wireless communications by the base station of FIG. 1 in accordance with aspects of the present disclosure.

Referring to FIG. 13, another example method of wireless communications is disclosed. The method 1300 may be performed by the base station 102 along with any of the components (see e.g., FIG. 14) of the base station 102. For example, the method 1300, may be performed by one or more of a processor 1412, a transceiver 1402, the modem 140, the compensation indication component 142, and/or one or more additional components/subcomponents of the base station 102. One or more aspects illustrated in FIG. 13 may be optional. Various implementations may include a method with any combination of the aspects described in connection with FIG. 13.

Turning to FIG. 13, at 1302, the method 1300 may include determining a timing advance value for a UE based on a propagation delay between the base station and the UE. For example, one or more of the processor 1412, the transceiver 1402, the modem 140, the compensation indication component 142 and/or one or more components/subcomponents of the base station 102 may be configured to determine a timing advance value for the UE 104 based on a propagation delay between the base station 102 and the UE 104. Thus, the processor 1412, the transceiver 1402, the modem 140, the compensation indication component 142, and/or one or more components/subcomponents of the base station 102 may define the means for determining a timing advance value for the UE 104 based on a propagation delay between the base station 102 and the UE 104.

At 1304, the method 1300 may also include determining a compensation factor for the UE to compensate the timing advance value of a UL transmission. For example, one or more of the processor 1412, the transceiver 1402, the modem 140, the compensation indication component 142 and/or one or more components/subcomponents of the base station 102 may be configured to determine a compensation factor for the UE 104 to compensate the timing advance value of a UL transmission. Thus, the processor 1412, the transceiver 1402, the modem 140, the compensation indication component 142, and/or one or more components/ subcomponents of the base station 102 may define the means for determining a compensation factor for the UE 104 to compensate the timing advance value of a UL transmission. In an example, the compensation factor may be based on or more of a distance between the base station 102 and the UE 104 or a propagation delay of communications between the base station 102 and the UE 104.

At 1306, the method 1300 may include transmitting the timing advance value and the compensation factor to the UE. For example, one or more of the processor 1412, the transceiver 1402, the modem 140, the compensation indication component 142 and/or one or more components/ subcomponents of the base station 102 may be configured to transmit the timing advance value and the compensation factor to the UE 104. Thus, the processor 1412, the transceiver 1402, the modem 140, the compensation indication component 142, and/or one or more components/subcomponents of the base station 102 may define the means for transmitting the timing advance value and the compensation factor to the UE 104.

Figure 14:
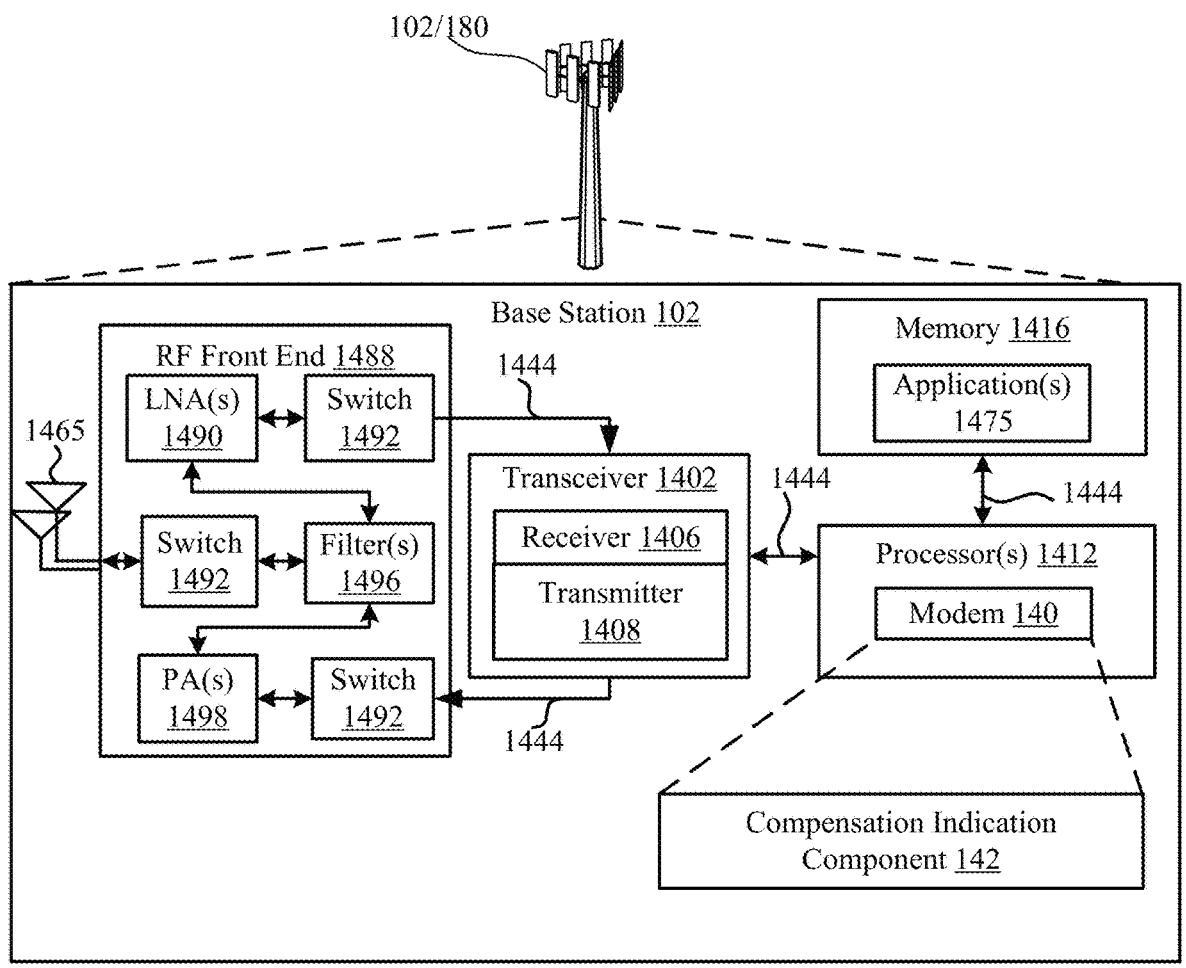
FIG. 14 is a schematic diagram of an example of the base station of FIG. 1 in accordance with aspects of the present disclosure.

Referring to FIG. 14, one example of an implementation of the base station 102 or 180 may include a variety of components, some of which have already been described above, but including components such as one or more processors 1412, memory 1416 and transceiver 1402 in communication via one or more buses 1444, which may operate in conjunction with the modem 140 and the compensation indication component 142 to enable one or more of the functions of the method 1300 described herein.

The transceiver 1402, receiver 1406, transmitter 1408, one or more processors 1412, memory 1416, applications 1475, buses 1444, RF front end 1488, LNAs 1490, switches 1492, filters 1496, PAs 1498, and one or more antennas 1465 may be the same as or similar to the corresponding components of the UE 104, as described above, but configured or otherwise programmed for base station operations as opposed to UE operations.

Figure 15:
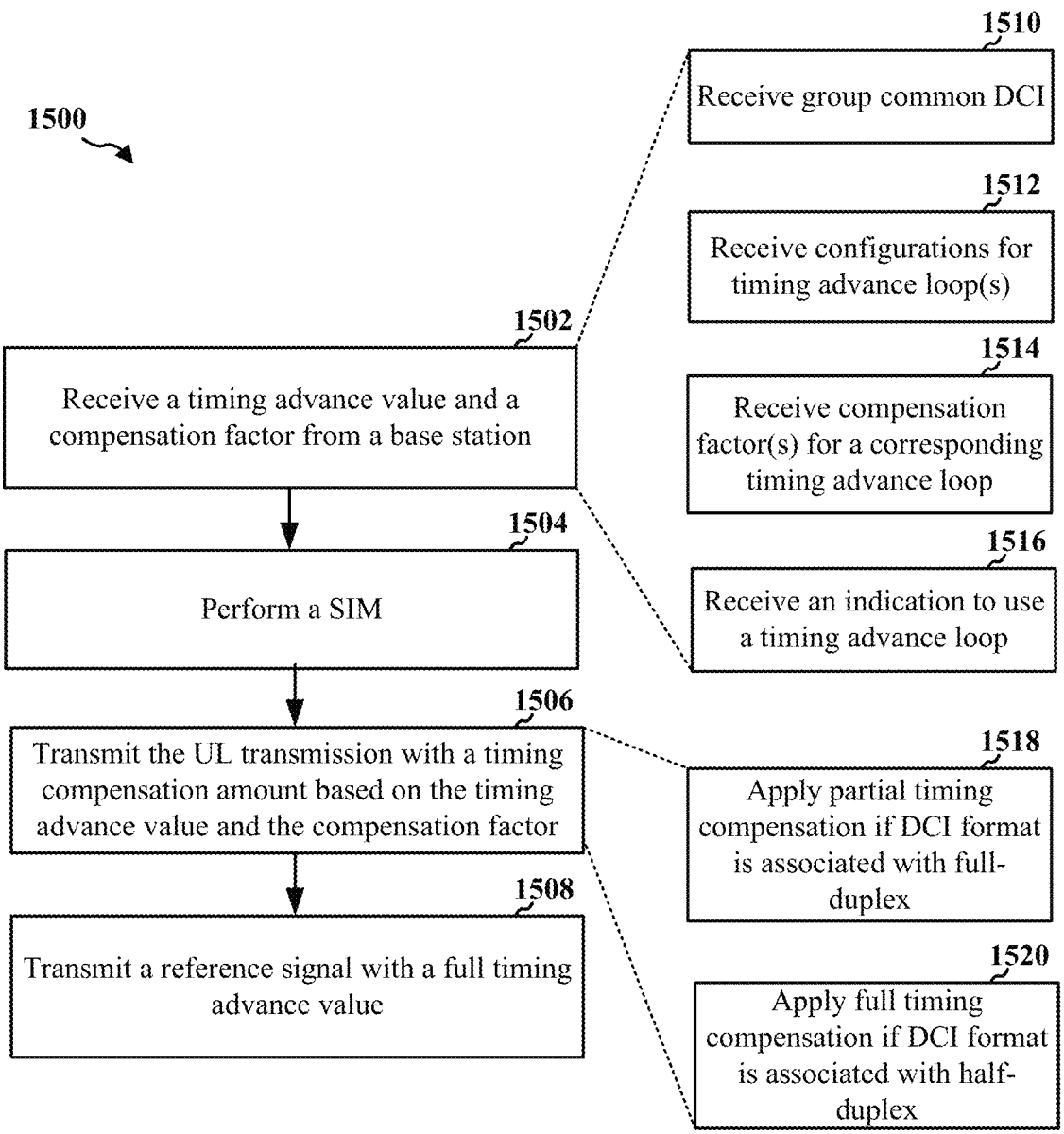
FIG. 15 is a flowchart of a method of wireless communication at a UE in accordance with various aspects of the present disclosure.

FIG. 15 is a flowchart 1500 of a method of wireless communication. In some aspects, the method may be performed by a UE (e.g., the UE 104, 350, 1002; the apparatus 1602). For example, the method may be performed by a UE 104 or 350 as described in connection with FIG. 1 and/or FIG. 3. One or more aspects illustrated in FIG. 15 may be optional. Various implementations may include a method with any combination of the aspects described in connection with FIG. 15. The method may enable the UE to adjust uplink timing to compensate for a propagation delay to a base station while also compensating for full duplex timing considerations at the UE.

At 1502, the UE receives, e.g., from a base station, a timing advance value and a compensation factor. The compensation factor may be a real number from 0 to 1, for example. In some aspects, the compensation factor may be received from the base station in one or more of an RRC message, a MAC-CE, or a DCI. The reception may be performed, e.g., by the timing parameter component 1640 of the apparatus 1602 in FIG. 16. FIG. 10 illustrates the UE 1002 receiving a timing advance 1010 and compensation factor 1012 from a base station 1004. In some aspects, the UE may receive a group-common downlink control information (DCI) that dynamically indicates the compensation factor, e.g., as illustrated at 1510. FIG. 9 illustrates an example of a base station grouping UEs, for example. In some aspects, the UE may receive, from the base station, configurations of one or more timing advance loops, e.g., as illustrated at 1512. At 1514, the UE may further receive, from the base station, one or more compensation factors including the compensation factor, where each of the one or more compensation factors is for a corresponding timing advance loop. In some aspects, the UE may then receive, at 1516, from the base station, an indication to use a timing advance loop from the one or more timing advance loops, the compensation factor corresponding to the indicated timing advance loop.

At 1506, the UE transmits, to the base station, an UL transmission with a timing compensation amount based on the timing advance value and the compensation factor. The transmission may be performed, e.g., by the uplink component 1642 via the transmission component 1634 and/or the RF transceiver 1622 of the apparatus 1602 in FIG. 16. FIG. 10 illustrates an example of the UE 1002 transmitting the UL transmission 1018 with a partial timing advance, for example. The timing compensation amount may be a partial value of the timing advance value received from the base station and may be based on a product of the timing advance value and the compensation factor, e.g., TA*α. The timing compensation amount may be a value between the timing advance value and the product of the timing advance value and the compensation factor. In some aspects, the UE may transmit the UL transmission with the timing compensation amount based on the UE being scheduled for full duplex communication. In other aspects, the timing compensation amount may be equal to the timing advance value based on the UL transmission not overlapping with a DL reception. In some aspects, the timing compensation amount may be a partial value of the timing advance value received from the base station. In some aspects, the UE may apply a partial timing compensation amount having a value less than the timing advance value if the UE is scheduled with a DCI format associated with a full duplex mode, as illustrated at 1518, and which may be referred to as a first DCI format. The UE may apply a full timing compensation amount having a value equal to the timing advance value if the UE is scheduled with a DCI format associated with a half-duplex mode, e.g., as illustrated at 1520, and which may be referred to as a second DCI format that is different than the first DCI format.

In some aspects, the UE may further perform a self-interference measurement, as illustrated at 1504. The timing compensation amount may be further based on the self-interference measurement. In order to perform the measurement, the UE may transmit a signal and measure interference on reception at the UE that is caused by the UE's transmission of the signal. The measurement may be performed, e.g., by the SIM component 1644 of the apparatus. FIG. 10 illustrates an example of the UE 1002 performing SIM measurements, at 1015, which the UE 1002 may use to adjust the timing advance at 1016.

As illustrated at 1508, the UE may further transmit a reference signal with a timing adjustment according to a full timing advance value. The transmission may be performed, e.g., by the RS component 1646 of the apparatus 1602 in FIG. 16. In some aspects, the RS may be an SRS. FIG. 10 illustrates an example of the UE 1002 transmitting a reference signal 1022 with a full timing advance based on the timing advance value 1010 received from the base station 1004.

The aspects regarding the timing advance determination and/or application may be further based on any of the aspects described in connection with FIG. 7-10.

Figure 16:
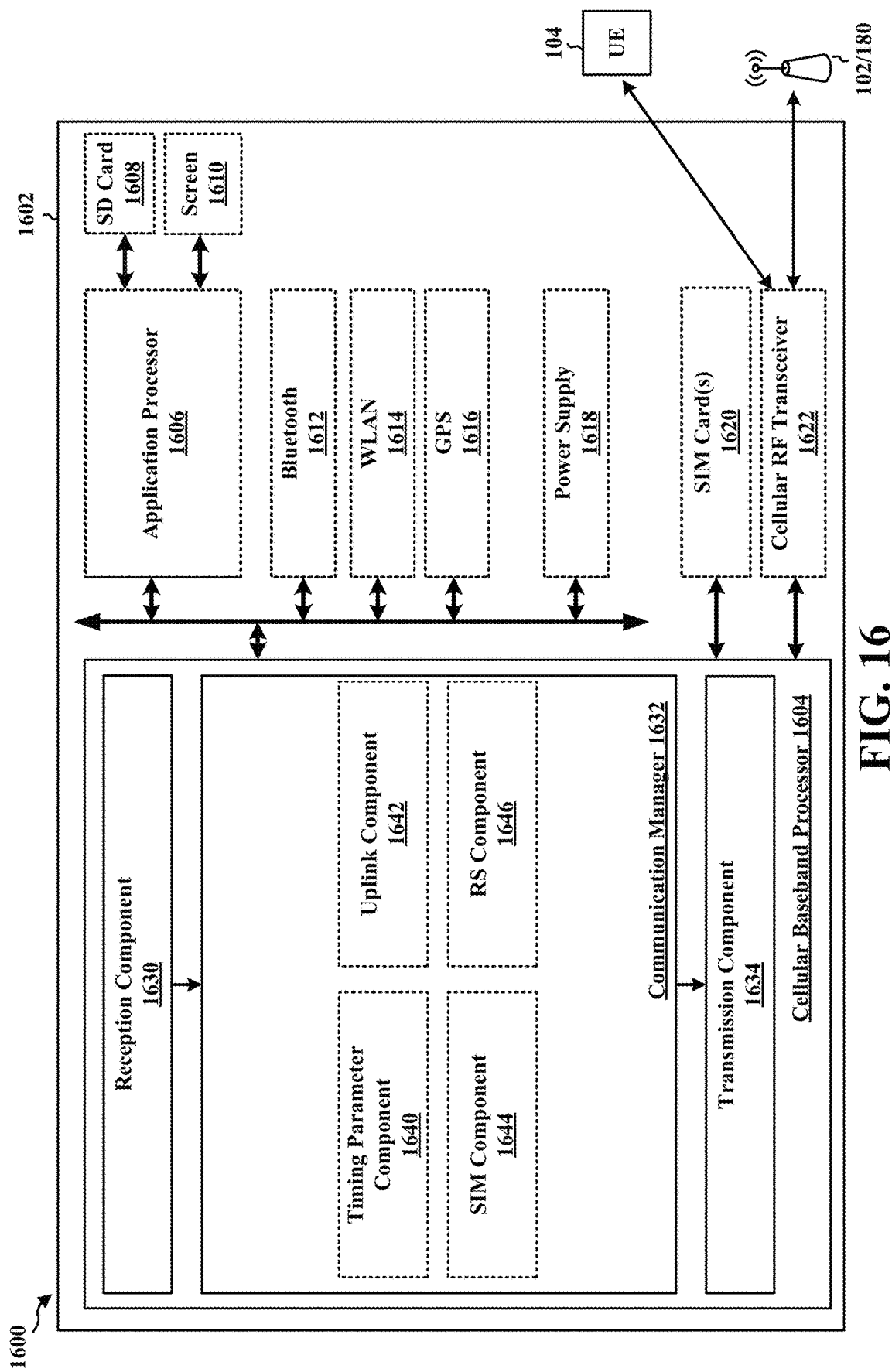
FIG. 16 is a diagram illustrating an example of a hardware implementation for an example apparatus in accordance with various aspects of the present disclosure.

FIG. 16 is a diagram 1600 illustrating an example of a hardware implementation for an apparatus 1602. In some aspects, the apparatus 1602 may be a UE or a component of a UE. The apparatus 1602 may include a cellular baseband processor 1604 (also referred to as a modem) coupled to a cellular RF transceiver 1622. In some aspects, the apparatus 1602 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and/or a power supply 1618. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described herein. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) and include the additional modules of the apparatus 1602.

The communication manager 1632 includes a timing parameter component 1640 that is configured to receive from a base station, a timing advance value and a compensation factor, e.g., as described in connection with 1502 in FIG. 15. The communication manager 1632 further includes an uplink component 1642 that is configured to transmit, to the base station, an UL transmission with a timing compensation amount based on the timing advance value and the compensation factor, e.g., as described in connection with 1506 in FIG. 15. The communication manager 1632 further includes a SIM component 1644 that is configured to perform a self-interference measurement, e.g., as described in connection with 1504 in FIG. 15. The communication manager 1632 further includes an RS component 1646 that is configured to transmit a reference signal with a timing adjustment according to a full timing advance value, e.g., as described in connection with 1508 in FIG. 15.

The apparatus may include additional components that perform each of the blocks of the algorithm in the flowchart of FIG. 11 or 15, and/or the aspects performed by the UE in FIG. 10. As such, each block in the flowcharts of FIGs. flowchart of FIG. 11 or 15, and/or the aspects performed by the UE in FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the cellular baseband processor 1604, includes means for receiving, from a base station, a timing advance value and a compensation factor; and means for transmitting, to the base station, an UL transmission with a timing compensation amount based on the timing advance value and the compensation factor. The apparatus 1602 may further include means for performing a self-interference measurement, wherein the timing compensation amount is further based on the self-interference measurement. The apparatus 1602 may further include means for transmitting, to the base station, a reference signal with a timing adjustment according to a full timing advance value. The apparatus 1602 may further include means for receiving a group-common DCI that dynamically indicates the compensation factor. The apparatus 1602 may further include means for receiving, from the base station, configurations of one or more timing advance loops. The apparatus 1602 may further include means for receiving, from the base station, one or more compensation factors including the compensation factor, where each of the one or more compensation factors is for a corresponding timing advance loop. The apparatus 1602 may further include means for receiving, from the base station, an indication to use a timing advance loop from the one or more timing advance loops, the compensation factor corresponding to the indicated timing advance loop. The apparatus 1602 may further include means for applying a partial timing compensation amount having a value less than the timing advance value if the UE is scheduled with a first DCI format associated with a full duplex mode; and applying a full timing compensation amount having a value equal to the timing advance value if the UE is scheduled with a second DCI format associated with a half-duplex mode. The means may be one or more of the components of the apparatus 1602 configured to perform the functions recited by the means. As described herein, the apparatus 1602 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 17:
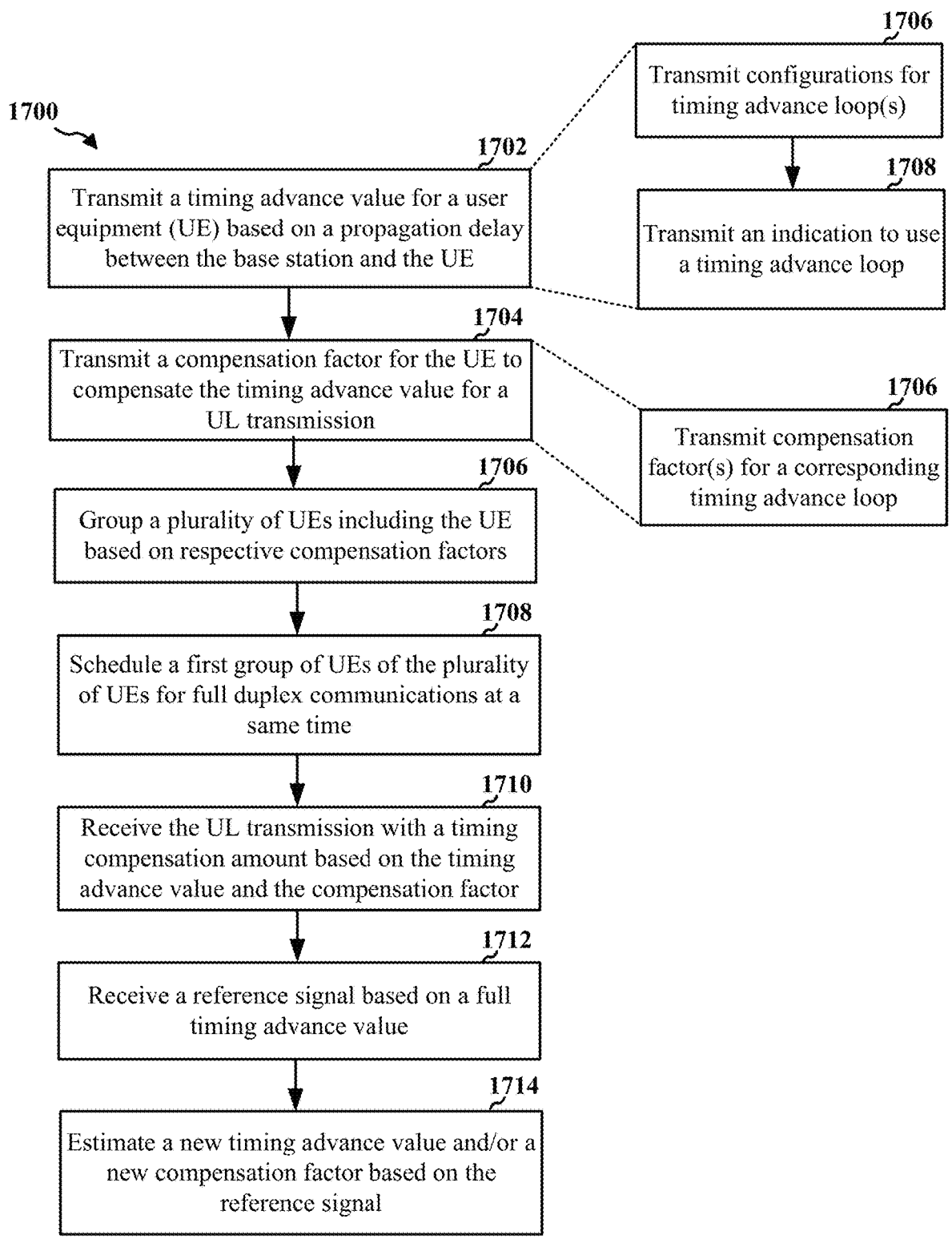
FIG. 17 is a flowchart of a method of wireless communication at a base station in accordance with various aspects of the present disclosure.

FIG. 17 is a flowchart 1700 of a method of wireless communication. In some aspects, the method may be performed by a base station or a component of a base station (e.g., the base station 102/180; the apparatus 1802. One or more aspects illustrated in FIG. 17 may be optional. Various implementations may include a method with any combination of the aspects described in connection with FIG. 17. The method may enable the base station to improve a range of coverage by enabling UEs having a longer propagation distance to apply a compensated timing advance in order to avoid/reduce self-interference when communicating in a full-duplex mode.

At 1702, the base station transmits, to a UE, a timing advance value based on a propagation delay between the base station and the UE. The transmission may be performed, e.g., by the timing parameter component 1840 of the apparatus 1802 in FIG. 18 via the transmission component 1834 and/or the transceiver 1822. FIG. 10 illustrates the base station transmitting a timing advance 1010 to the UE 1002.

At 1704, the base station transmits, to the UE, a compensation factor for the UE to compensate the timing advance value for an UL transmission. In some aspects, the compensation factor may be based on a distance between the base station and the UE. The base station may transmit the compensation factor to the UE in one or more of an RRC message, a MAC-CE, or a DCI. The compensation factor may be a real number from 0 to 1. The transmission may be performed, e.g., by the timing parameter component 1840 of the apparatus 1802 in FIG. 18 via the transmission component 1834 and/or the transceiver 1822. FIG. 10 illustrates the base station transmitting a compensation factor 1012 to the UE 1002.

At 1710, the base station receives, from the UE, the UL transmission with a timing compensation amount based on the timing advance value and the compensation factor. The reception may be performed, e.g., by the uplink component 1842 via the reception component 1830 and transceiver 1822 of the apparatus 1802 in FIG. 18. FIG. 10 illustrates an example of the base station 1004 receiving the UL transmission 1018 with a partial timing advance, for example.

The timing compensation amount may be a partial value of the timing advance value. As illustrated at 1712, the base station may receive, from the UE, a reference signal based on a full timing advance value. The reception may be performed, e.g., by the RS component 1846 via the reception component 1830 and the transceiver 1822. In some aspects, the RS may be an SRS. The RS may enable the base station to update timing advance and/or compensation values, for example.

As illustrated at 1714, the UE may estimate one or more of a new timing advance value or a new compensation factor based on the reference signal. The estimation, or determination, may be performed, e.g., by the timing component 1844 of the apparatus 1802 in FIG. 18.

As illustrated at 1706, the base station may transmit, to the UE, configurations of one or more timing advance loops having timing compensation values. As illustrated at 1706, the base station may transmit, to the UE, one or more compensation factors including the compensation factor. Each of the one or more compensation factors may be for a corresponding timing advance loop. As illustrated at 1708, the base station may transmit, to the UE, an indication to use a timing advance loop from the one or more timing advance loops.

In some aspects, the base station may group a plurality of UEs including the UE based on respective compensation factors, e.g., as illustrated at 1706. The base station may schedule a first group of UEs of the plurality of UEs for full duplex communications at a same time. FIG. 9 illustrates an example of a base station grouping UEs.

The aspects regarding the timing advance determination and/or application may be further based on any of the aspects described in connection with FIG. 7-10.

Figure 18:
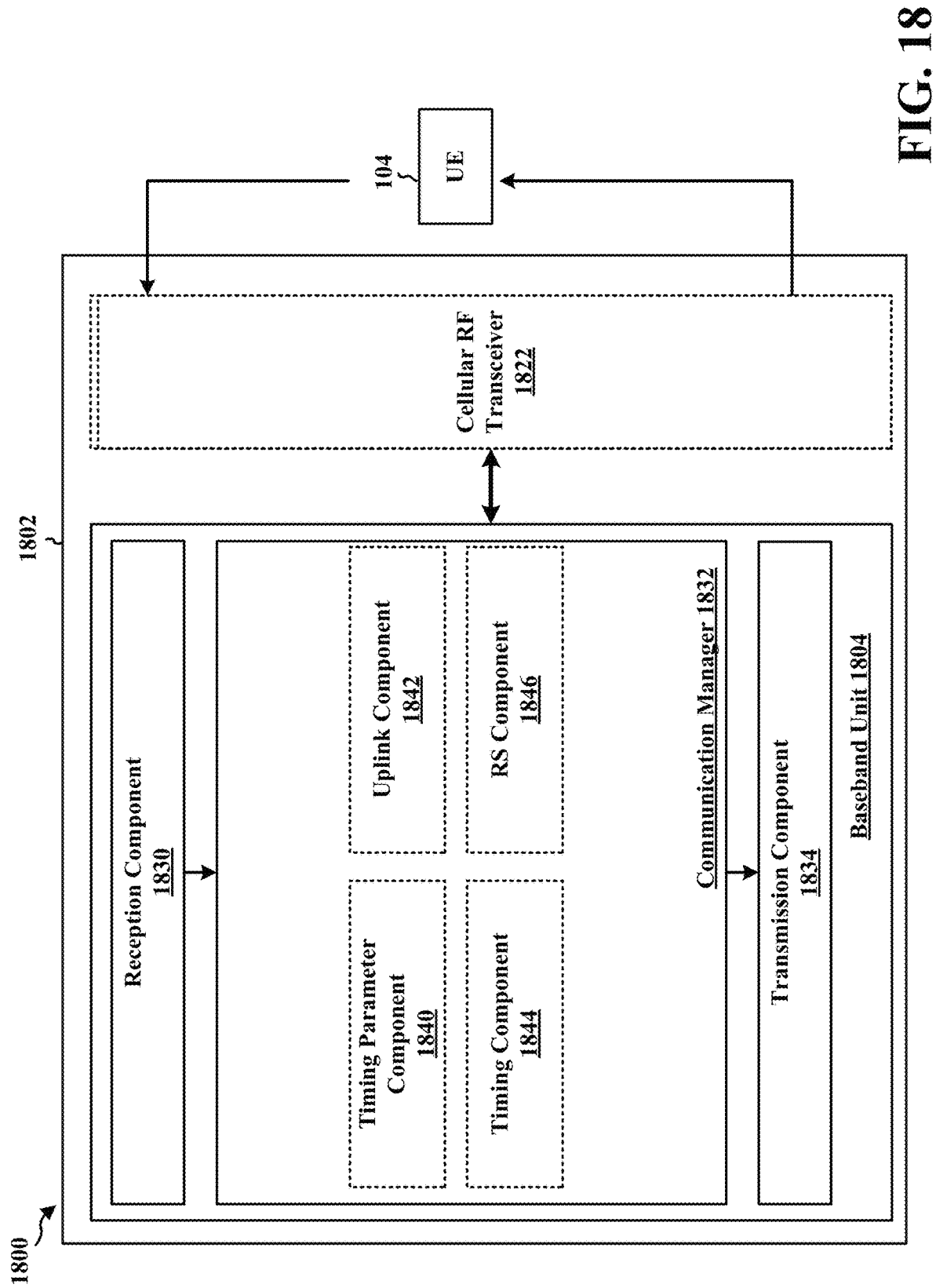
FIG. 18 is a diagram illustrating an example of a hardware implementation for an example apparatus in accordance with various aspects of the present disclosure.

FIG. 18 is a diagram 1800 illustrating an example of a hardware implementation for an apparatus 1802. The apparatus 1802 may be a base station or a component of a base station, for example. The apparatus 1802 may include a baseband unit 1804. The baseband unit 1804 may communicate through a cellular RF transceiver 1822 with the UE 104. The baseband unit 1804 may include a computer-readable medium/memory. The baseband unit 1804 is responsible for general processing, including the execution of software stored on the computer-readable medium/memory. The software, when executed by the baseband unit 1804, causes the baseband unit 1804 to perform the various functions described herein. The computer-readable medium/memory may also be used for storing data that is manipulated by the baseband unit 1804 when executing software. The baseband unit 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband unit 1804. The baseband unit 1804 may be a component of the base station 310 and may include the memory 376 and/or at least one of the TX processor 316, the RX processor 370, and the controller/processor 375.

The communication manager 1832 includes a timing parameter component 1840 that is configured to transmit a timing advance value based on a propagation delay and/or a compensation factor, e.g., as described in connection with 1702 and/or 1704 in FIG. 17. The communication manager 1832 further includes an uplink component 1842 that is configured to receive, from the UE, the UL transmission with a timing compensation amount based on the timing advance value and the compensation factor, e.g., as described in connection with 1710 in FIG. 17. The communication manager 1832 further includes a timing component 1844 that is configured to estimate one or more of a new timing advance value or a new compensation factor based on the reference signal, e.g., as described in connection with 1714 in FIG. 17. The communication manager 1832 further includes an RS component 1846 that is configured to receive, from the UE, a reference signal based on a full timing advance value, e.g., as described in connection with 1712 in FIG. 17.

The apparatus may include additional components that perform each of the blocks of the algorithm in the flowcharts of FIGS. 13 and/or 17, as well as the aspects performed by the base station in FIG. 10. As such, each block in the flowcharts of FIGS. 13 and/or 17, as well as the aspects performed by the base station in FIG. 10, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1802 may include a variety of components configured for various functions. In one configuration, the apparatus 1802, and in particular the baseband unit 1804, includes means for transmitting, to a UE, a timing advance value based on a propagation delay between the base station and the UE and means for transmitting, to the UE, a compensation factor for the UE to compensate the timing advance value for an UL transmission. The apparatus 1802 may further include means for receiving, from the UE, the UL transmission with a timing compensation amount based on the timing advance value and the compensation factor. The apparatus 1802 may further include means for receiving, from the UE, a reference signal based on a full timing advance value; and means for estimating one or more of a new timing advance value or a new compensation factor based on the reference signal. The apparatus 1802 may further include means for transmitting, to the UE, configurations of one or more timing advance loops having timing compensation values. The apparatus 1802 may further include means for transmitting, to the UE, one or more compensation factors including the compensation factor. The apparatus 1802 may further include means for transmitting, to the UE, an indication to use a timing advance loop from the one or more timing advance loops. The apparatus 1802 may further include means for grouping a plurality of UEs including the UE based on respective compensation factors; and means for scheduling a first group of UEs of the plurality of UEs for full duplex communications at a same time. The means may be one or more of the components of the apparatus 1802 configured to perform the functions recited by the means. As described herein, the apparatus 1802 may include the TX Processor 316, the RX Processor 370, and the controller/processor 375. As such, in one configuration, the means may be the TX Processor 316, the RX Processor 370, and the controller/processor 375 configured to perform the functions recited by the means.

An example method of wireless communication by a UE, comprising: receiving, from a base station, a timing advance value and a compensation factor; determining a timing compensation amount indicating an amount of time to adjust an uplink (UL) transmission based on the timing advance value and the compensation factor; and transmitting, to the base station, the UL transmission according to the timing compensation amount.

The above example method, wherein the determining the timing compensation amount includes determining a product of the timing advance value and the compensation factor.

One or more of the above example methods, wherein the determining the timing compensation amount further comprises selecting a value between the timing advance value and the product of the timing advance value and the compensation factor.

One or more of the above example methods, further comprising: transmitting a signal; and determining a self-interference value based on interference between the signal and a received signal, wherein the determining the timing compensation amount is further based on the self-interference value.

One or more of the above example methods, further comprising: determining the UE is configured for full duplex communications, wherein the transmitting the UL transmission according to the timing compensation amount is in response to the determining the UE is configured for the full duplex communications.

One or more of the above example methods, further comprising: determining that the UL transmission is not overlapping with a downlink (DL) reception, wherein determining the timing compensation amount comprises determining the timing compensation amount to be equal to the timing advance value.

One or more of the above example methods, wherein: the timing compensation amount is a partial timing advance compensation, and the method further comprising: transmitting, to the base station, a reference signal according to a full timing advance compensation.

One or more of the above example methods, wherein the compensation factor is received from the base station by one of a radio resource control (RRC) message, a control element (CE) message, or a downlink (DL) control indicator (DCI).

One or more of the above example methods, further comprising: receiving a group-common downlink (DL) control indicator (DCI) that dynamically indicates the compensation factor.

One or more of the above example methods, further comprising: receiving, from the base station, configurations of one or more timing advance loops to apply the timing compensation amount to.

One or more of the above example methods, further comprising: receiving, from the base station, one or more compensation factors including the compensation factor, wherein each of the one or more compensation factors is for each of the one or more timing advance loops.

One or more of the above example methods, further comprising: receiving, from the base station, an indication of which of the one or more timing advance loops to use, wherein receiving the one or more compensation factors is based on the indication.

One or more of the above example methods, further comprising: receiving, from the base station, an indicator having a downlink (DL) control indicator (DCI) format; and determining a downlink (DL) control indicator (DCI) format based on the indicator, wherein the timing compensation amount is less than the timing advance value in response to the DCI format being a first DCI format associated with a full duplex mode, and wherein the timing compensation amount is equal to the timing advance value in response to the DCI format being a second DCI format associated with a half-duplex mode.

One or more of the above example methods, wherein the compensation factor is a real number from 0 to 1.

An example device comprising a transceiver, a memory configured to store instructions, and one or more processors communicatively coupled with the transceiver and the memory, wherein the one or more processors are configured to perform all or part of one or more of the above example methods.

Another example apparatus for use in a device comprising means for wireless communications, means for storing instructions and data, and means for performing all or part of one or more of the above example methods.

An example computer-readable medium storing computer executable code to perform all or part of one or more of the above example methods.

An example second method of wireless communication by a base station, comprising: determining a timing advance value for a UE based on a propagation delay between the base station and the UE; determining a compensation factor for the UE to compensate the timing advance value of a UL transmission; and transmitting the timing advance value and the compensation factor to the UE.

The above second example method, further comprising: receiving, from the UE, the UL transmission based on a timing compensation amount determined based on the timing advance value and the compensation factor.

One or more of the above second example methods, wherein the compensation factor is based on a distance between the base station and the UE.

One or more of the above second example methods, wherein: the timing compensation value is a partial timing advance compensation, and the method further comprising: receiving, from the UE, a reference signal according to a full timing advance compensation; and estimating one or more of a new timing advance value or a new compensation factor based on the reference signal.

One or more of the above second example methods, wherein the compensation factor is transmitted to the UE by one of a radio resource control (RRC) message, a control element (CE) message, or a downlink (DL) control indicator (DCI).

One or more of the above second example methods, further comprising: transmitting, to the UE, configurations of one or more timing advance loops to apply the timing compensation value to.

One or more of the above second example methods, further comprising: transmitting, to the UE, one or more compensation factors including the compensation factor, wherein each of the one or more compensation factors is for each of the one or more timing advance loops.

One or more of the above second example methods, further comprising: transmitting, to the UE, an indication of which of the one or more timing advance loops to use.

One or more of the above second example methods, further comprising: grouping a plurality of UEs including the UE based on respective compensation factors; and scheduling a first group of UEs of the plurality of UEs for full duplex communications at a same time.

One or more of the above second example methods, wherein the compensation factor is a real number from 0 to 1.

An example device comprising a transceiver, a memory configured to store instructions, and one or more processors communicatively coupled with the transceiver and the memory, wherein the one or more processors are configured to perform all or part of one or more of the above second example methods.

Another example apparatus for use in a device comprising means for wireless communications, means for storing instructions and data, and means for performing all or part of one or more of the above second example methods.

An example computer-readable medium storing computer executable code to perform all or part of one or more of the above second example methods.

Yet another example can include a method of wireless communication by a user equipment (UE). The method may include determining a timing compensation amount. The timing compensation amount can indicate an amount of time to adjust a transmission (e.g., a downlink transmission and/or an uplink (UL) transmission). Adjustments or modifications can be based on a timing advance value and/or a compensation factor. A method can include transmitting (e.g., to a base station and/or other network node), a transmission according to the timing compensation amount (e.g., UL and/or DL). And a method may include receiving a timing advance value and a compensation factor (e.g., from a base station and/or other network node). Implementations can include hardware for implementing the method in this example.

Other examples can include a method of wireless communication by a base station. Such a method can include one or more following features including: determining a timing advance value for a user equipment (UE) based on a propagation delay between the base station and the UE; determining a compensation factor for the UE to compensate the timing advance value of an uplink (UL) transmission; and transmitting the timing advance value and the compensation factor to the UE. Implementations can include hardware for implementing the method options and/or features in this example.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or examples may be described or claimed in the singular, the plural is contemplated unless limitation to the singular is explicitly stated. Additionally, all or a portion of any aspect, example, and/or embodiment may be utilized with all or a portion of any other aspect, example, and/or embodiment, unless stated otherwise. Thus, the disclosure is not to be limited to the examples and designs described herein but is to be accorded the widest scope consistent with the principles and novel features disclosed herein.

The following aspects are illustrative only and may be combined with other aspects or teachings described herein, without limitation.

Aspect 1 is a method of wireless communication by a UE, comprising: receiving, from a base station, a timing advance value and a compensation factor; and transmitting, to the base station, an UL transmission with a timing compensation amount based on the timing advance value and the compensation factor.

In aspect 2, the method of aspect 1 further includes that the timing compensation amount is a partial value of the timing advance value received from the base station and is based on a product of the timing advance value and the compensation factor.

In aspect 3, the method of aspect 2 further includes that the timing compensation amount is a value between the timing advance value and the product of the timing advance value and the compensation factor.

In aspect 4, the method of any of aspects 1-3 further includes performing a self-interference measurement, wherein the timing compensation amount is further based on the self-interference measurement.

In aspect 5, the method of any of aspects 1-4 further includes that the UE transmits the UL transmission with the timing compensation amount based on the UE being scheduled for full duplex communication.

In aspect 6, the method of any of aspects 1-4 further includes that the timing compensation amount is equal to the timing advance value based on the UL transmission not overlapping with a DL reception.

In aspect 7, the method of any of aspects 1-6 further includes that the timing compensation amount is a partial value of the timing advance value received from the base station, the method further comprising: transmitting, to the base station, a reference signal with a timing adjustment according to a full timing advance value.

In aspect 8, the method of any of aspects 1-7 further includes that the compensation factor is received from the base station in one or more of an RRC message, a MAC-CE message, or DCI.

In aspect 9, the method of any of aspects 1-7 further includes receiving a group-common DCI that dynamically indicates the compensation factor.

In aspect 10, the method of any of aspects 1-9 further includes that receiving, from the base station, configurations of one or more timing advance loops.

In aspect 11, the method of any of aspects 1-10 further includes receiving, from the base station, one or more compensation factors including the compensation factor, wherein each of the one or more compensation factors is for a corresponding timing advance loop.

In aspect 12, the method of any of aspects 1-11 further includes receiving, from the base station, an indication to use a timing advance loop from the one or more timing advance loops, the compensation factor corresponds to the indicated timing advance loop.

In aspect 13, the method of any of aspects 1-12 further includes applying a partial timing compensation amount having a value less than the timing advance value if the UE is scheduled with a first DCI format associated with a full duplex mode; and applying a full timing compensation amount having a value equal to the timing advance value if the UE is scheduled with a second downlink control information (DCI) format associated with a half-duplex mode.

In aspect 14, the method of any of aspects 1-13 further includes that the compensation factor is a real number from 0 to 1.

Aspect 15 is an apparatus for wireless communication including at least one processor coupled to a memory and configured to implement a method as in any of aspects 1 to 14.

In aspect 16, the apparatus of aspect 15 further includes a transceiver, where the memory and the at least one processor are configured to receive the timing advance value and compensation value and to transmit the UL transmission via the transceiver.

Aspect 17 is an apparatus for wireless communication including means for implementing a method as in any of aspects 1 to 14.

In aspect 18, the apparatus of aspect 17 includes a transceiver.

Aspect 19 is a non-transitory computer-readable medium storing computer executable code, where the code when executed by a processor causes the processor to implement a method as in any of aspects 1 to 14.

Aspect 20 is a method of wireless communication by a base station, comprising: transmitting, to a UE, a timing advance value based on a propagation delay between the base station and the UE; transmitting, to the UE, a compensation factor for the UE to compensate the timing advance value for an UL transmission; and receiving, from the UE, the UL transmission with a timing compensation amount based on the timing advance value and the compensation factor.

In aspect 21, the method of aspect 20 further includes that the compensation factor is based on a distance between the base station and the UE.

In aspect 22, the method of aspect 20 or aspect 21 further includes that the timing compensation amount is a partial value of the timing advance value, the method further comprising: receiving, from the UE, a reference signal based on a full timing advance value; and estimating one or more of a new timing advance value or a new compensation factor based on the reference signal.

In aspect 23, the method of any of aspects 20-22 further includes that the compensation factor is transmitted to the UE in one or more of a RR) message, a MAC-CE message, or DCI.

In aspect 24, the method of any of aspects 20-23 further includes transmitting, to the UE, configurations of one or more timing advance loops having timing compensation values.

In aspect 25, the method of aspect 24 further includes transmitting, to the UE, one or more compensation factors including the compensation factor, wherein each of the one or more compensation factors is for a corresponding timing advance loop.

In aspect 26, the method of aspect 25 further includes transmitting, to the UE, an indication to use a timing advance loop from the one or more timing advance loops.

In aspect 27, the method of any of aspects 20-26 further includes grouping a plurality of UEs including the UE based on respective compensation factors; and scheduling a first group of UEs of the plurality of UEs for full duplex communications at a same time.

In aspect 28, the method of any of aspects 20-27 further includes the compensation factor is a real number from 0 to 1.

Aspect 29 is an apparatus for wireless communication including at least one processor coupled to a memory and configured to implement a method as in any of aspects 20-28.

In aspect 30, the apparatus of aspect 29 further includes a transceiver.

Aspect 31 is an apparatus for wireless communication including means for implementing a method as in any of aspects 20-28.

In aspect 32, the apparatus of aspect 31 further includes a transceiver.

Aspect 33 is a non-transitory computer-readable medium storing computer executable code, where the code when executed by a processor causes the processor to implement a method as in any of aspects 20-28.

What is claimed is:

1. An apparatus for wireless communication at a user equipment (UE), comprising:
memory; and
at least one processor coupled to the memory, the at least one processor configured to cause the apparatus to:
receive a timing advance value and a compensation factor via a transceiver;
transmit, via the transceiver, a first uplink (UL) transmission with a partial timing compensation amount based on a range between the timing advance value and a product of the timing advance value and the compensation factor; and
transmit a second UL transmission with a full timing compensation amount equal to the timing advance value.

2. The apparatus of claim 1, further comprising the transceiver.

3. The apparatus of claim 1, wherein a lower end of the range is based on the product of the timing advance value and the compensation factor and an upper end of the range is based on the timing advance value.

4. The apparatus of claim 1, wherein the partial timing compensation amount is a value between the timing advance value and the product of the timing advance value and the compensation factor.

5. The apparatus of claim 1, wherein the at least one processor is further configured to cause the apparatus to:
perform a self-interference measurement, wherein the partial timing compensation amount is further based on the self-interference measurement.

6. The apparatus of claim 1, wherein the at least one processor is configured to cause the apparatus to transmit the first UL transmission with the partial timing compensation amount based on the UE being scheduled for full duplex communication.

7. The apparatus of claim 1, wherein the full timing compensation amount of the second UL transmission is equal to the timing advance value based on the second UL transmission not overlapping with a downlink (DL) reception.

8. The apparatus of claim 1, wherein the partial timing compensation amount is a partial value of the timing advance value, and the at least one processor is further configured to cause the apparatus to:
transmit a reference signal with a timing adjustment according to a full timing advance value.

9. The apparatus of claim 1, wherein the compensation factor is in one or more of a radio resource control (RRC) message, a medium-access control-control element (MAC-CE) message, or downlink control information (DCI).

10. The apparatus of claim 1, wherein the at least one processor is further configured to cause the apparatus to:
receive a group-common downlink control information (DCI) that dynamically indicates the compensation factor.

11. The apparatus of claim 1, wherein the at least one processor is further configured to cause the apparatus to:
receive configurations of one or more timing advance loops.

12. The apparatus of claim 11, wherein the at least one processor is further configured to cause the apparatus to:
receive one or more compensation factors including the compensation factor, wherein each of the one or more compensation factors is for a corresponding timing advance loop.

13. The apparatus of claim 12, wherein the at least one processor is further configured to cause the apparatus to:
receive an indication to use a timing advance loop from the one or more timing advance loops, the compensation factor corresponds to the timing advance loop.

14. The apparatus of claim 1, wherein the at least one processor is further configured to cause the apparatus to:
apply the partial timing compensation amount having a first value less than the timing advance value if the UE is scheduled with a first downlink control information (DCI) format associated with a full duplex mode; and
apply the full timing compensation amount having a second value equal to the timing advance value if the UE is scheduled with a second DCI format associated with a half-duplex mode.

15. The apparatus of claim 1, wherein the compensation factor is a real number from 0 to 1.

16. An apparatus for wireless communication at a network node, comprising:
memory; and
at least one processor coupled to the memory configured to cause the apparatus to:
transmit a timing advance value for a user equipment (UE) based on a propagation delay between the network node and the UE;
transmit, via a transceiver, a compensation factor for the UE to compensate the timing advance value for an uplink (UL) transmission;
receive, via the transceiver, a first UL transmission with a partial timing compensation amount based on a range between the timing advance value and a product of the timing advance value and the compensation factor; and
receive a second UL transmission with a full timing compensation amount equal to the timing advance value.

17. The apparatus of claim 16, further comprising the transceiver.

18. The apparatus of claim 16, wherein the compensation factor is based on a distance between the network node and the UE.

19. The apparatus of claim 16, wherein the at least one processor is further configured to cause the apparatus to:
receive, from the UE, a reference signal based on a full timing advance value; and
estimate one or more of a new timing advance value or a new compensation factor based on the reference signal.

20. The apparatus of claim 16, wherein the at least one processor is configured to cause the apparatus to transmit the compensation factor for the UE in one or more of a radio resource control (RRC) message, a medium access control-control element (MAC-CE) message, or downlink control information (DCI).

21. The apparatus of claim 16, wherein the at least one processor is further configured to cause the apparatus to:
transmit configurations for the UE of one or more timing advance loops having timing compensation values.

22. The apparatus of claim 21, wherein the at least one processor is further configured to cause the apparatus to:
transmit one or more compensation factors for the UE, the one or more compensation factors including the compensation factor, wherein each of the one or more compensation factors is for a corresponding timing advance loop.

23. The apparatus of claim 22, wherein the at least one processor is further configured to cause the apparatus to:
transmit an indication for the UE to use a timing advance loop from the one or more timing advance loops.

24. The apparatus of claim 16, wherein the at least one processor is further configured to cause the apparatus to:
group a plurality of UEs including the UE based on respective compensation factors; and
schedule a first group of UEs of the plurality of UEs for full duplex communications at a same time.

25. The apparatus of claim 16, wherein the compensation factor is a real number from 0 to 1.

26. A method of wireless communication by a user equipment (UE), comprising:
receiving a timing advance value and a compensation factor;
transmitting a first uplink (UL) transmission with a partial timing compensation amount based on a range between the timing advance value and a product of the timing advance value and the compensation factor; and
transmitting a second UL transmission with a full timing compensation amount equal to the timing advance value.

27. The method of claim 26, wherein a lower end of the range is based on the product of the timing advance value and the compensation factor and an upper end of the range is based on the timing advance value.

28. The method of claim 26, further comprising:
performing a self-interference measurement, wherein the partial timing compensation amount is further based on the self-interference measurement.

29. A method of wireless communication by a network node, comprising:
transmitting a timing advance value for a user equipment (UE) based on a propagation delay between the network node and the UE;
transmitting a compensation factor for the UE to compensate the timing advance value for an uplink (UL) transmission;
receiving a first UL transmission with a partial timing compensation amount based on a range between the timing advance value and a product of the timing advance value and the compensation factor; and
receiving a second UL transmission with a full timing compensation amount equal to the timing advance value.

30. The method of claim 29, the method further comprising:
receiving, from the UE, a reference signal based on a full timing advance value; and
estimating one or more of a new timing advance value or a new compensation factor based on the reference signal.

* * * * *